(12) United States Patent
Wu et al.

(10) Patent No.: US 11,895,631 B2
(45) Date of Patent: *Feb. 6, 2024

(54) METHOD AND DEVICE IN UE AND BASE STATION FOR RADIO SIGNAL TRANSMISSION IN WIRELESS COMMUNICATION

(71) Applicants: Lu Wu, Shanghai (CN); Xiaobo Zhang, Shanghai (CN)

(72) Inventors: Lu Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/695,872

(22) Filed: Mar. 16, 2022

(65) Prior Publication Data
US 2022/0210786 A1 Jun. 30, 2022

Related U.S. Application Data

(63) Continuation of application No. 16/801,189, filed on Feb. 26, 2020, now Pat. No. 11,317,406.

(30) Foreign Application Priority Data

Feb. 26, 2019 (CN) .......................... 201910141796.5

(51) Int. Cl.
*H04W 72/04* (2023.01)
*H04W 72/0446* (2023.01)
*H04W 72/23* (2023.01)

(52) U.S. Cl.
CPC ....... *H04W 72/0446* (2013.01); *H04W 72/23* (2023.01)

(58) Field of Classification Search
CPC ........... H04W 72/082; H04W 72/0446; H04W 72/042; H04W 72/23; H04W 76/023;
(Continued)

(56) References Cited

U.S. PATENT DOCUMENTS 10,299,261 B2 * 5/2019 Chun .................... H04L 1/1614
11,071,172 B2 * 7/2021 He ........................ H04W 80/08
(Continued)

FOREIGN PATENT DOCUMENTS

CN 109150403 A 1/2019
WO 2018126414 A1 7/2018
(Continued)

OTHER PUBLICATIONS

CN201910141796.5 First Office Action dated Aug. 16, 2022.
(Continued)

*Primary Examiner* — Wei Zhao

(57) ABSTRACT

A method and a device are provided in a UE and a base station for wireless communication. The UE receives a first signaling, and operates a first radio signal in K time domain resource(s). The first signaling is used for determining the K time domain resource(s), K is a positive integer; the first radio signal carries a first bit block, a first time-domain-resource size and a target parameter are used for determining the size of the first bit block, at least one of the K time domain resource(s) is used for determining the first time-domain-resource size; the target parameter is a first or a second parameter; whether the target parameter is the first parameter or the second parameter is related to the first time-domain-resource size, or, whether the target parameter is the first parameter or the second parameter is related to the K; the operating action is transmitting or receiving.

20 Claims, 18 Drawing Sheets

(58) Field of Classification Search
CPC ............. H04W 16/10; H04W 56/0015; H04W 56/005; H04L 1/16; H04L 5/0055
See application file for complete search history.

(56) References Cited

U.S. PATENT DOCUMENTS

| | | | |
|---|---|---|---|
| 2016/0112977 A1* | 4/2016 | Byun | H04W 76/14 370/350 |
| 2019/0045390 A1 | 2/2019 | Davydov | |
| 2020/0106559 A1* | 4/2020 | Vilaipornsawai | H04W 72/23 |

FOREIGN PATENT DOCUMENTS

| | | |
|---|---|---|
| WO | 2018172939 A1 | 9/2018 |
| WO | 2018203818 A1 | 11/2018 |

OTHER PUBLICATIONS

CN201910141796.5 First Search Report dated Aug. 9, 2022.
Ericsson "On Supporting High Reliability for Data Transmission" 3GPP Tsg RAN1 WG1 Meeting NR#3 R1-1716600, Sep. 12, 2017.
Huawei, HiSilicon "Resource allocation and TBS" 3GPP TSG RAN WG1 Meeting #91 R1-1719381 Nov. 18, 2017.
NTT Docomo, Inc "Offline summary for AI 7.3.3.4 UL data transmission procedure" 3GPP TSG RAN WG1 NR Ad Hoc Meeting R1-1801080, Jan. 24, 2018.

* cited by examiner

Fifth-type value = number of subcarriers comprised in a PRB × first time-domain-resource size − third-type value − target parameter

⇓ fourth-type value = min(first reference threshold, fifth-type value)

⇓

First-type value = fourth-type value × number of PRBs occupied by first radio signal

⇓

Target value = first-type value × number of layers of first radio signal × target bit rate of first radio signal × modulation order of first radio signal

⇓

First reference value  ⟵  Second-type reference integer set

⇓

Second-type value = max(second reference threshold, first reference value)

⇓

Size of first bit block  ⟵  First-type reference integer set

FIG. 15

Fifth-type value = number of subcarriers comprised in a PRB × first time-
    domain-resource size − third-type value − target parameter

⇓

Fourth-type value = min(first reference threshold, fifth-type value)

⇓

First-type value = fourth-type value × number of PRBs occupied by first radio signal

⇓

Target value = first-type value × number of layers of first radio signal × target
bit rate of first radio signal × modulation order of first radio signal

⇓

Reference target value = target value − second bit number

⇓

First reference value ⬅—————— Second-type reference integer set

⇓

Second-type value = max( second reference threshold, first reference value)

⇓

Size of first bit block ⬅——— First-type reference integer set

FIG. 16

METHOD AND DEVICE IN UE AND BASE STATION FOR RADIO SIGNAL TRANSMISSION IN WIRELESS COMMUNICATION

CROSS REFERENCE TO RELATED APPLICATION

This application is a continuation of the U.S. patent application Ser. No. 16/801,189, filed on Feb. 26, 2020, which claims the priority benefit of Chinese Patent Application No. 201910141796.5, filed on Feb. 26, 2019, the full disclosure of which is incorporated herein by reference.

BACKGROUND

Technical Field

The present disclosure relates to transmission methods and devices in wireless communication systems, and in particular to a method and a device for radio signal transmission in a wireless communication system that supports cellular network.

Related Art

In 5G system, in order to support more demanding Ultra Reliable and Low Latency Communication (URLLC) traffic, for example, with higher reliability (e.g., a target BLER of $10^{-6}$) or with lower latency (e.g., 0.5-1 ms), a study item (SI) of URLLC advancement in New Radio (NR) Release 16 was approved at the 3rd GenerationPartner Project (3GPP) Radio Access Network (RAN)#80 Plenary Session. One focus of the study is how to realize lower transmission latency and higher transmission reliability of Physical Uplink Shared CHannel (PUSCH).

In NR system, some reserved Resource Elements (REs) cannot be occupied by a Physical Downlink Shared CHannel (PDSCH)/PUSCH, such as REs reserved for Channel-State Information Reference Signals (CSI-RS) and COntrolREsourceSET (CORESET). Influences of such REs shall be considered when calculating Transport Block Size (TBS) carried by a PDSCH/PUSCH. In NR the influences of these REs on the TBS are represented by xOverhead.

SUMMARY

Inventors find through researches that in NR Release 16, to better meet the requirement of higher reliability of URLLC traffic, there are two candidate techniques under study, which are repetition of PDSCH/PUSCH transmission and multi-segment transmission. Employing either of the transmission schemes will require a consideration of an impact on TBS calculation on a PDSCH/PUSCH.

In view of the above problem, the present disclosure discloses a solution. It should be noted that the embodiments of the present disclosure and the characteristics in the embodiments may be mutually combined when no conflict is incurred.

The present disclosure provides a method in a User Equipment (UE) for wireless communication, comprising:
  receiving a first signaling, the first signaling being used to determine K time domain resource(s), K being a positive integer; and
  operating a first radio signal in the K time domain resource(s);

herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

In one embodiment, a problem needed to be solved in the present disclosure is that since different transmission schemes correspond to different overheads, the impact on the calculation of TBS carried by a PDSCH/PUSCH should be taken into account.

In one embodiment, various overheads may be incurred when employing different transmission schemes, for instance, CSI-RS or CORESET may correspond to different xOverheads. Therefore, when calculating TBS carried by a PDSCH/PUSCH in each transmission scheme, differentxOverheads shall be considered.

In one embodiment, the essence of the present disclosure lies in that a size of a first bit block is a TBS, a first time-domain-resource size is a number of multicarrier symbols comprised intime-frequency resources used to determine the TBS, a target parameter is an xOverhead, while a first parameter and a second parameter are alternative values of the xOverhead; when the first time-domain-resource size is smaller, the xOverhead may be smaller; when the first time-domain-resource size is larger, the xOverhead may be larger; therefore, the xOverhead is related to the first time-domain-resource size. An advantage of the above method is that the xOverheadadapts better to the first time-domain-resource size, thereby increasing the precision of TBS calculation.

In one embodiment, the essence of the present disclosure lies in that a size of a first bit blocks is a TBS, a first time-domain-resource size is a number of multicarrier symbols comprised intime-frequency resources used to determine the TBS, a target parameter is an xOverhead, while a first parameter and a second parameter are alternative values of the xOverhead; K is a number of retransmissions of the first bit block in a slot; the PDSCH/PUSCH transmission scheme supported by NR Release 15 corresponds to the case when K is equal to 1, and repetition of PDSCH/PUSCH transmissions studied by NR Release 16 corresponds to the case when K is greater than 1; an xOverhead incurred when K is greater than 1 may be smaller than an xOverhead incurred when K is equal to 1, so xOverhead is dependent on K. An advantage of the above method is that TBS calculation can be more accurate if varied xOverheads are used for respective transmission schemes.

In one embodiment, the essence of the present disclosure lies in that a size of a first bit blocks is a TBS, a first time-domain-resource size is a number of multicarrier symbols comprised intime-frequency resources used to determine the TBS, a target parameter is an xOverhead, while a first parameter and a second parameter are alternative values of the xOverhead; K is a number of slots to which time-frequency resources used to determine the TBS belong; the PDSCH/PUSCH transmission scheme supported by NR Release 15 corresponds to the case when K is equal to 1, and Multi-segment transmission studied by NR Release 16 corresponds to the case when K is greater than 1; an xOverhead incurred when K is greater than 1 may be larger than an xOverhead incurred when K is equal to 1, so xOverhead is dependent on K. An advantage of the above method is that TBS calculation can be more accurate if varied xOverheads are used for respective transmission schemes.

According to one aspect of the present disclosure, the above method is characterized in that a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

In one embodiment, the essence of the above method lies in that the xOverhead is related to a first time-domain-resource size; a first integer set and a second integer set are two possible value ranges for the first time-domain-resource size, and respectively correspond to two possible values of xOverheads. The above method is advantageous in that xOverhead can be more adaptable to the first time-domain-resource size, thus delivering more precise calculation of TBS.

According to one aspect of the present disclosure, the above method is characterized in that when the K is equal to 1, the first time-domain-resource size is equal to size of the K time domain resource, the target parameter is the first parameter; when the K is greater than 1, the K time domain resources are mutually orthogonal, the first time-domain-resource size is equal to size of one of the K time domain resources, the target parameter is the second parameter.

In one embodiment, the essence of the above method lies in that the xOverhead is dependent on K, K is a number of retransmissions of the first bit block in a slot; the PDSCH/PUSCH transmission scheme supported by NR Release 15 corresponds to the case when K is equal to 1, and repetition of PDSCH/PUSCH transmissions studied by NR Release 16 corresponds to the case when K is greater than 1; when K is equal to 1, the xOverhead is a first parameter, when K is greater than 1, the xOverhead is a second parameter. An advantage of the above method is that TBS calculation can be more accurate if varied xOverheads are used for respective transmission schemes.

According to one aspect of the present disclosure, the above method is characterized in that when the K is equal to 1, the first time-domain-resource size is equal to size of the K time domain resource, the target parameter is the first parameter; when the K is greater than 1, the K time domain resources are mutually orthogonal, the first time-domain-resource size is equal to a sum of sizes respectively corresponding to the K time domain resources, the target parameter is the second parameter.

In one embodiment, the essence of the above method lies in that the xOverhead is dependent on K, K is a number of slots to which time-frequency resources used to determine the TBS belong; the PDSCH/PUSCH transmission scheme supported by NR Release 15 corresponds to the case when K is equal to 1, and Multi-segment transmission studied by NR Release 16 corresponds to the case when K is greater than 1; when K is equal to 1, the xOverhead is a first parameter, when K is greater than 1, the xOverhead is a second parameter. An advantage of the above method is that TBS calculation can be more accurate if varied xOverheads are used for respective transmission schemes.

According to one aspect of the present disclosure, the above method is characterized in that the K is greater than 1, and the K is used to determine the second parameter.

According to one aspect of the present disclosure, the above method is characterized in that the K is greater than 1, the first radio signal comprises K sub-signals, and the K sub-signals are respectively transmitted in the K time domain resources, each of the K sub-signals carrying the first bit block.

According to one aspect of the present disclosure, the above method is characterized in comprising:
receiving first information;
herein, the first information indicates the first parameter.

The present disclosure provides a method in a base station for wireless communication, comprising:
transmitting a first signaling, the first signaling being used to determine K time domain resource(s), K being a positive integer; and
executing a first radio signal in the K time domain resource(s);
herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the executing is receiving, or, the executing is transmitting.

According to one aspect of the present disclosure, the above method is characterized in that a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

According to one aspect of the present disclosure, the above method is characterized in that relative magnitude of the first time-domain-resource size and a first threshold is used to determine the target parameter between the first parameter and the second parameter, the first threshold is a positive integer.

According to one aspect of the present disclosure, the above method is characterized in that when the K is equal to 1, the first time-domain-resource size is equal to size of the K time domain resource, the target parameter is the first parameter; when the K is greater than 1, the K time domain resources are mutually orthogonal, the first time-domain-resource size is equal to size of one of the K time domain resources, the target parameter is the second parameter.

According to one aspect of the present disclosure, the above method is characterized in that when the K is equal to 1, the first time-domain-resource size is equal to size of the K time domain resource, the target parameter is the first parameter; when the K is greater than 1, the K time domain resources are mutually orthogonal, the first time-domain-resource size is equal to a sum of sizes respectively corresponding to the K time domain resources, the target parameter is the second parameter.

According to one aspect of the present disclosure, the above method is characterized in that the K is greater than 1, and the K is used to determine the second parameter.

According to one aspect of the present disclosure, the above method is characterized in that the K is greater than 1, the first radio signal comprises K sub-signals, the K sub-signals are respectively transmitted in the K time domain resources, each of the K sub-signals carrying the first bit block.

According to one aspect of the present disclosure, the above method is characterized in comprising:
transmitting first information;
herein, the first information indicates the first parameter.

The present disclosure provides a UE for wireless communication, comprising:
a first receiver, receiving a first signaling, the first signaling being used to determine K time domain resource(s), K being a positive integer;
a first transceiver, operating a first radio signal in the K time domain resource(s);
herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

The present disclosure provides a base station for wireless communication, comprising:
a second transmitter, transmitting a first signaling, the first signaling being used to determine K time domain resource(s), K being a positive integer; and
a second transceiver, executing a first radio signal in the K time domain resource(s);
herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the executing is receiving, or, the executing is transmitting.

In one embodiment, the present disclosure is advantageous over conventional schemes in the following aspects:

Given that employing different transmission schemes may result in different overheads, the impact on the calculation of TBS carried by a PDSCH/PUSCH shall be taken into account. To solve the problem, a scheme is proposed in the present disclosure.

Different transmission schemes may correspond to different overheads, for example, the xOverhead incurred may vary when CSI-RS and CORESET are respectively employed. Therefore, in calculating TBS carried by a PDSCH/PUSCH in each transmission scheme, much consideration shall be given to the change of xOverhead. To solve the problem, a scheme is proposed in the present disclosure.

When the size of time domain resources used to determine TBS is smaller, the xOverhead is smaller; when the size of time domain resources used to determine TBS is larger, the xOverhead is larger. In methods of the present disclosure, the xOverhead can be more adaptable to the size of time domain resources used to determine TBS, thereby delivering more accurate calculation of TBS.

K is a number of repeated transmissions of a first bit block within a slot; the PDSCH/PUSCH transmission scheme supported by NR Release 15 is applied when K is equal to 1, while the multiple repetitions of PDSCH/PUSCH transmission under study of NR Release 16 will be applied when K is greater than 1; the xOverhead incurred when K is greater than 1 may be smaller than the xOverhead incurred when K is equal to 1. According to methods put forward in the present disclosure, xOverhead is dependent on K, so for each transmission scheme a different xOverhead will be applied so as to achieve more precise TBS calculation.

K is a number of slots to which time-frequency resources used to determine the TBS belong; the PDSCH/PUSCH transmission scheme supported by NR Release 15 is applied when K is equal to 1, while the Multi-segment transmission studied by NR Release 16 is applied when K is greater than 1; the xOverhead incurred when K is greater than 1 may be larger than the xOverhead incurred when K is equal to 1. According to methods put forward in the present disclosure, xOverhead is dependent on K, so for each transmission scheme a different xOverhead will be applied so as to achieve more precise TBS calculation.

BRIEF DESCRIPTION OF THE DRAWINGS

Other features, objects and advantages of the present disclosure will become more apparent from the detailed description of non-restrictive embodiments taken in conjunction with the following drawings:

FIG. 15 illustrates a schematic diagram of a first time-domain-resource size and a target parameter being used to determine size of a first bit block according to one embodiment of the present disclosure.

FIG. 16 illustrates another schematic diagram of a first time-domain-resource size and a target parameter being used to determine size of a first bit block according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
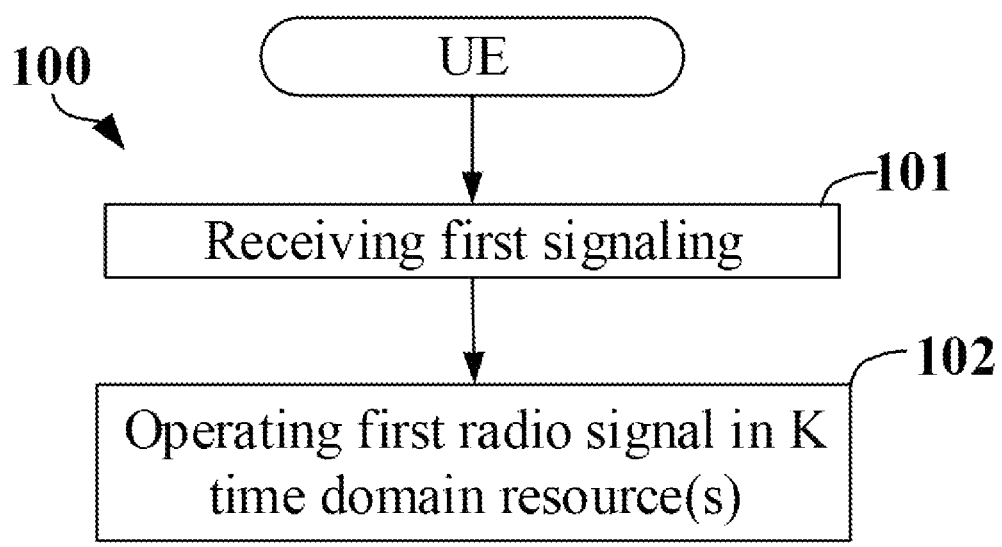
FIG. 1 illustrates a flowchart of a first signaling and a first radio signal according to one embodiment of the present disclosure.

Embodiment 1 illustrates a flowchart of a first signaling and a first radio signal, as shown in FIG. 1. In Step 100 illustrated in FIG. 1, each box represents a step. Particularly, the sequential order of steps in these boxes does not necessarily mean that the steps are chronologically arranged.

In Embodiment 1, the UE in the present disclosure receives a first signaling in step 101, the first signaling being used to determine K time domain resource(s), K being a positive integer; and operates a first radio signal in the K time domain resource(s) in Step 102. Herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

In one embodiment, the operating is transmitting.

In one embodiment, the operating is receiving.

In one embodiment, the first signaling is dynamically configured.

In one embodiment, the first signaling is a physical layer signaling.

In one embodiment, the first signaling is a Downlink Control Information (DCI) signaling.

In one embodiment, the first signaling is a DCI signaling with Uplink Grant, and the operating is transmitting.

In one embodiment, the first signaling is a DCI signaling with Downlink Grant, and the operating is receiving.

In one embodiment, the first signaling is transmitted on a downlink physical layer control channel (i.e., a downlink channel only capable of carrying a physical layer signaling).

In one subembodiment of the above embodiment, the downlink physical layer control channel is a Physical DownlinkControlCHannel (PDCCH).

In one subembodiment of the above embodiment, the downlink physical layer control channel is a short PDCCH (sPDCCH).

In one subembodiment of the above embodiment, the downlink physical layer control channel is a New Radio PDCCH (NR-PDCCH).

In one subembodiment of the above embodiment, the downlink physical layer control channel is a NarrowBand PDCCH (NB-PDCCH).

In one embodiment, the first signaling is transmitted on a downlink physical layer data channel (i.e., a downlink channel capable of carrying physical layer data).

In one subembodiment of the above embodiment, the downlink physical layer control channel is a Physical Downlink Shared CHannel (PDSCH).

In one subembodiment of the above embodiment, the downlink physical layer control channel is a short PDSCH (sPDSCH).

In one subembodiment of the above embodiment, the downlink physical layer control channel is a NewRadio PDSCH (NR-PDSCH).

In one subembodiment of the above embodiment, the downlink physical layer control channel is a NarrowBand PDSCH (NB-PDSCH).

In one embodiment, the operating is receiving, the first signaling is DCI format 1_0, and the specific meaning of the DCI format 1_0 can be found in 3GPPTS38.212, section 7.3.1.2.

In one embodiment, the operating is receiving, the first signaling is DCI format 1_1, and the specific meaning of the DCI format 1_1 can be found in 3GPPTS38.212, section 7.3.1.2.

In one embodiment, the operating is receiving, the first signaling is DCI format 0_0, and the specific meaning of the DCI format 0_0 can be found in 3GPPTS38.212, section 7.3.1.1.

In one embodiment, the operating is receiving, the first signaling is DCI format 0_1, and the specific meaning of the DCI format 0_1 can be found in 3GPPTS38.212, section 7.3.1.1.

In one embodiment, the K is equal to 1, the K time domain resource comprises a positive integer number of multicarrier symbol(s) in time domain.

In one embodiment, the K is equal to 1, the K time domain resource comprises a positive integer number of consecutive multicarrier symbols in time domain.

In one embodiment, the K is greater than 1, any of the K time domain resources comprises a positive integer number of multicarrier symbol(s) in time domain.

In one embodiment, the K is greater than 1, any of the K time domain resources comprises a positive integer number of consecutive multicarrier symbols in time domain.

In one embodiment, the K is greater than 1, any two of the K time domain resources are orthogonal (that is, non-overlapping).

In one embodiment, the K is greater than 1, any two of the K time domain resources do not comprise a same multicarrier symbol.

In one embodiment, the K is greater than 1, there isn't any multicarrier symbol belonging to two of the K time domain resources at the same time.

In one embodiment, the multicarrier symbol is an OrthogonalFrequency Division Multiplexing (OFDM) symbol.

In one embodiment, the multicarrier symbol is a Single-Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, the K is equal to 1, the first time-domain-resource size is the size of the K time domain resource.

In one embodiment, the K is greater than 1, one of the K time domain resources is used to determine the first time-domain-resource size.

In one embodiment, the K is greater than 1, the first time-domain-resource size is the size of one of the K time domain resources.

In one embodiment, the K is greater than 1, the first time-domain-resource size is the size of an earliest time domain resource of the K time domain resources.

In one embodiment, the K is greater than 1, the first time-domain-resource size is a smallest value out of values respectively corresponding to the K time domain resources.

In one embodiment, the K is greater than 1, the first time-domain-resource size is a greatest value out of values respectively corresponding to the K time domain resources.

In one embodiment, the K is greater than 1, the K time domain resources are jointly used to determine the first time-domain-resource size.

In one embodiment, the K is greater than 1, the first time-domain-resource size is a sum of sizes respectively corresponding to the K time domain resources.

In one embodiment, the K is equal to 1, the size of the K time domain resource is a number of multicarrier symbols comprised in the K time domain resource.

In one embodiment, the K is greater than 1, size of a given time domain resource is a number of multicarrier symbols comprised in the given time domain resource, the given time domain resource is one of the K time domain resources.

In one embodiment, the K is greater than 1, a size corresponding to a given time domain resource is a number of multicarrier symbols comprised in the given time domain resource, the given time domain resource is any time domain resource of the K time domain resources.

In one embodiment, the first signaling indicates the K time domain resource(s).

In one embodiment, the first signaling comprises a first field, the first field comprised by the first signaling indicates the K time domain resource(s).

In one subembodiment, the K is equal to 1.

In one subembodiment, the K is greater than 1.

In one subembodiment, the first field comprised by the first signaling comprises a positive integer number of bits.

In one subembodiment, the operating is transmitting, the first field comprised by the first signaling is Time domain resource assignment, the specific meaning of the Time domain resource assignment can be found in 3GPPTS38.214, section 6.1.2.

In one subembodiment, the operating is receiving, the first field comprised by the first signaling is Time domain resource assignment, the specific meaning of the Time domain resource assignment can be found in 3GPPTS38.214, section 5.1.2.

In one embodiment, the K is greater than 1, the first signaling comprises K fields, and the K fields comprised by the first signaling respectively indicate the K time domain resources.

In one subembodiment, any of the K fields comprised by the first signaling comprises a positive integer number of bits.

In one embodiment, the K is greater than 1, the first signaling comprises a second field, the second field comprised by the first signaling indicates a reference time domain resource, the reference time domain resource is one of the K time domain resources, and the reference time domain resource is used to determine K−1 time domain resource(s) of the K time domain resources other than the reference time domain resource.

In one subembodiment, the second field comprised by the first signaling comprises a positive integer number of bits.

In one subembodiment, the operating is transmitting, the second field comprised by the first signaling is Time domain resource assignment, the specific meaning of the Time domain resource assignment can be found in 3GPPTS38.214, section 6.1.2.

In one subembodiment, the operating is receiving, the second field comprised by the first signaling is Time domain resource assignment, the specific meaning of the Time domain resource assignment can be found in 3GPPTS38.214, section 5.1.2.

In one subembodiment, the reference time domain resource is an earliest time domain resource of the K time domain resources.

In one subembodiment, the K time domain resources are consecutive.

In one subembodiment, the operating is transmitting, the K time domain resources are composed of consecutive multicarrier symbols.

In one subembodiment, the operating is transmitting, the K time domain resources are composed of consecutive uplink multicarrier symbols.

In one subembodiment, the operating is receiving, the K time domain resources are composed of consecutive downlink multicarrier symbols.

In one subembodiment, any two adjacent time domain resources of the K time domain resources are consecutive.

In one subembodiment, a time gap between any two adjacent time domain resources of the K time domain resources is pre-defined.

In one subembodiment, a time gap between any two adjacent time domain resources of the K time domain resources is equal to 0.

In one subembodiment, a time gap between any two adjacent time domain resources of the K time domain resources is configurable.

In one subembodiment, a time gap between any two adjacent time domain resources of the K time domain resources is configured by a higher layer signaling.

In one subembodiment, a time gap between any two adjacent time domain resources of the K time domain resources is indicated by the first signaling.

In one embodiment, a time gap between two given time domain resources refers to a difference between a start time of a later one of the two given time domain resources and an end time of an earlier one of the two given time domain resources.

In one embodiment, a time gap between two given time domain resources refers to a difference between an index of a starting multicarrier symbol of a later one of the two given time domain resources and an index of an ending multicarrier symbol of an earlier one of the two given time domain resources.

In one embodiment, a time gap between two given time domain resources refers to an integer obtained after a difference between an index of a starting multicarrier symbol of a later one of the two given time domain resources and an index of an ending multicarrier symbol of an earlier one of the two given time domain resources is reduced by 1.

In one embodiment, the phrase that a time gap between two given time domain resources is equal to 0 means that the two given time domain resources are consecutive.

In one embodiment, the phrase that a time gap between two given time domain resources is equal to 0 means that a starting multicarrier symbol of a later one of the two given time domain resources and an ending multicarrier symbol of an earlier one of the two given time domain resources are consecutive.

In one embodiment, the phrase that a time gap between two given time domain resources is equal to 0 means that a difference between an index of a starting multicarrier symbol of a later one of the two given time domain resources and an index of an ending multicarrier symbol of an earlier one of the two given time domain resources is equal to 1.

In one embodiment, the phrase that a time gap between two given time domain resources is unequal to 0 means that the two given time domain resources are non-consecutive.

In one embodiment, the phrase that a time gap between two given time domain resources is unequal to 0 means that a starting multicarrier symbol of a later one of the two given time domain resources and an ending multicarrier symbol of an earlier one of the two given time domain resources are non-consecutive.

In one embodiment, the phrase that a time gap between two given time domain resources is unequal to 0 means that a difference between an index of a starting multicarrier symbol of a later one of the two given time domain resources and an index of an ending multicarrier symbol of an earlier one of the two given time domain resources is greater than 1.

In one embodiment, the first signaling indicates scheduling information of the first radio signal.

In one embodiment, the scheduling information of the first radio signal comprises at least one of occupied time domain resource, occupied frequency domain resource, a Modulation and Coding Scheme (MCS), configuration of DeModulation Reference Signals (DMRS), a Hybrid Automatic Repeat reQuest (HARD) process number, a Redundancy Version (RV), a New Data Indicator (NDI), a transmitting antenna port, corresponding multi-antenna related transmission or corresponding multi-antenna related reception.

In one subembodiment of the above embodiment, the occupied time domain resource comprised in the scheduling information of the first radio signal comprises the K time domain resource(s).

In one subembodiment of the above embodiment, the configuration information of the DMRS comprised in the scheduling information of the first radio signal comprises at least one of a Reference Signal (RS) sequence, a mapping mode, type of DMRS, occupied time domain resource, occupied frequency domain resource, occupied code domain resource, a cyclic shift, or an Orthogonal Cover Code (OCC).

In one embodiment, the multi-antenna related reception refers to Spatial Rx parameters.

In one embodiment, the multi-antenna related reception refers to receiving beam.

In one embodiment, the multi-antenna related reception refers to receiving beamforming matrix.

In one embodiment, the multi-antenna related reception refers to receiving analog beamforming matrix.

In one embodiment, the multi-antenna related reception refers to receiving analog beamforming vector.

In one embodiment, the multi-antenna related reception refers to receiving beamforming vector.

In one embodiment, the multi-antenna related reception refers to receiving spatial filtering.

In one embodiment, the multi-antenna related transmission refers to Spatial Tx parameters.

In one embodiment, the multi-antenna related transmission refers to transmitting beam.

In one embodiment, the multi-antenna related transmission refers to transmitting beamforming matrix.

In one embodiment, the multi-antenna related transmission refers to transmitting analog beamforming matrix.

In one embodiment, the multi-antenna related transmission refers to transmitting analog beamforming vector.

In one embodiment, the multi-antenna related transmission refers to transmitting beamforming vector.

In one embodiment, the multi-antenna related transmission refers to transmitting spatial filtering.

In one embodiment, the Spatial Tx parameters include one or more of a transmitting antenna port, a transmitting antenna port set, a transmitting beam, a transmitting analog beamforming matrix, a transmitting analog beamforming vector, a transmitting beamforming matrix, a transmitting beamforming vector and a transmitting spatial filtering.

In one embodiment, the Spatial Rx parameters include one or more of a receiving beam, a receiving analog beamforming matrix, a receiving analog beamforming vector, a receiving beamforming matrix, a receiving beam forming vector and a receiving spatial filtering.

In one embodiment, the first bit block comprises a positive integer number of bits.

In one embodiment, the first bit block comprises a Transport Block (TB).

In one embodiment, the first bit block comprises a positive integer number of TB s.

In one embodiment, the size of the first bit block is a number of bits comprised in the first bit block.

In one embodiment, the size of the first bit block is a TBS.

In one embodiment, the first radio signal comprises data.

In one embodiment, the first radio signal comprises data and DMRS.

In one embodiment, the K is equal to 1, the first radio signal comprises a transmission of the first bit block.

In one embodiment, the K is greater than 1, the first radio signal comprises K sub-signals, and the K sub-signals are respectively K transmissions of the first bit block.

In one embodiment, a given radio signal is obtained after the first bit block is sequentially subjected to CRC Insertion, Channel Coding, Rate Matching, Scrambling, Modulation, Layer Mapping, Precoding, Mapping to Resource Element, OFDM Basedband Signal Generation, and Modulation and Upconversion.

In one subembodiment, the K is equal to 1, the given radio signal is the first radio signal.

In one subembodiment, the K is greater than 1, the first radio signal comprises K sub-signals, the given radio signal is the first radio signal.

In one subembodiment, the K is greater than 1, the first radio signal comprises K sub-signals, the given radio signal is one of the K sub-signals.

In one embodiment, a given radio signal is obtained after the first bit block is sequentially subjected to CRC Insertion, Channel Coding, Rate Matching, Scrambling, Modulation, Layer Mapping, Precoding, Mapping to Virtual Resource Blocks, OFDM Basedband Signal Generation, and Modulation and Upconversion.

In one subembodiment, the K is equal to 1, the given radio signal is the first radio signal.

In one subembodiment, the K is greater than 1, the first radio signal comprises K sub-signals, the given radio signal is the first radio signal.

In one subembodiment, the K is greater than 1, the first radio signal comprises K sub-signals, the given radio signal is one of the K sub-signals.

In one embodiment, a given radio signal is obtained after the first bit block is sequentially subjected to CRC Insertion, Segmentation, Code block-level CRC Insertion, Channel Coding, Rate Matching, Concatenation, Scrambling, Modulation, Layer Mapping, Precoding, Mapping to Resource Element, OFDM Basedband Signal Generation, and Modulation and Upconversion.

In one subembodiment, the K is equal to 1, the given radio signal is the first radio signal.

In one subembodiment, the K is greater than 1, the first radio signal comprises K sub-signals, the given radio signal is the first radio signal.

In one subembodiment, the K is greater than 1, the first radio signal comprises K sub-signals, the given radio signal is one of the K sub-signals.

In one embodiment, the first parameter is a non-negative real number.

In one embodiment, the first parameter is a positive real number.

In one embodiment, the second parameter is a non-negative real number.

In one embodiment, the second parameter is a positive real number.

In one embodiment, the first parameter is a non-negative integer.

In one embodiment, the first parameter is a positive integer.

In one embodiment, the second parameter is a non-negative integer.

In one embodiment, the second parameter is a positive integer.

In one embodiment, the first parameter is different from the second parameter.

In one embodiment, the first parameter is greater than the second parameter.

In one embodiment, the first parameter is less than the second parameter.

In one embodiment, the first parameter is an integer out of 0, 6, 12 and 18.

In one embodiment, the first parameter is an integer out of 6, 12 and 18.

In one embodiment, the first parameter is 0.

In one embodiment, the first parameter is 6.

In one embodiment, the first parameter is 12.

In one embodiment, the first parameter is 18.

In one embodiment, the operating is receiving, the first parameter is axOverhead field of a PDSCH-ServingCell-Config IE of an RRC signaling, and the specific meaning of the xOverhead field can be found in 3GPPTS38.331, section 6.3.2.

In one embodiment, the operating is transmitting, the first parameter is a xOverhead field of a PUSCH-ServingCell-Config IE of an RRC signaling, and the specific meaning of the xOverhead field can be found in 3GPPTS38.331, section 6.3.2.

Embodiment 2

Figure 2:
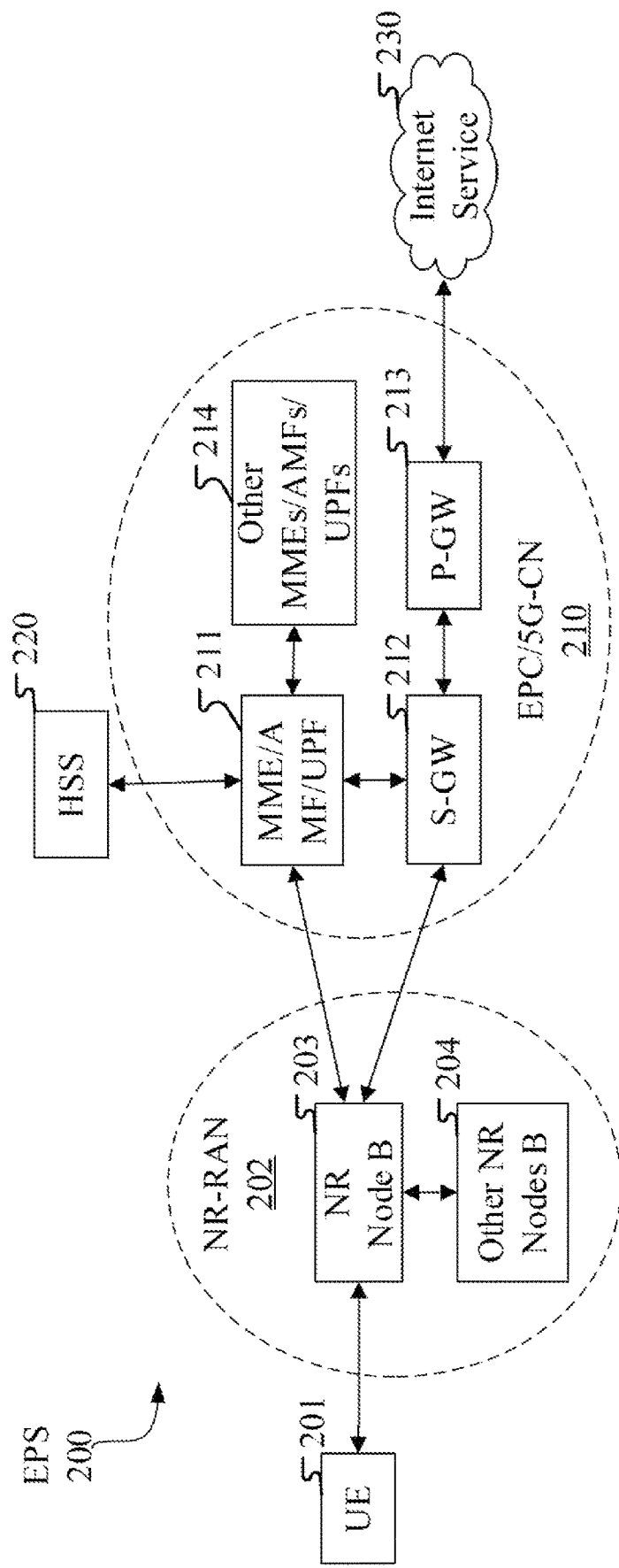
FIG. 2 illustrates a schematic diagram of a network architecture according to one embodiment of the present disclosure.

Embodiment 2 illustrates a schematic diagram of a network architecture, as shown in FIG. 2.

Embodiment 2 illustrates a schematic diagram of a network architecture according to the present disclosure, as shown in FIG. 2. FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-CoreNetwork (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client, automobile, vehicle or some other appropriate terms. The gNB 203 is connected with the EPC/5G-CN 210 via an S1/NG interface. The EPC/5G-CN 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming Services (PSS).

In one embodiment, the UE 201 corresponds to the UE in the present disclosure.

In one embodiment, the gNB 203 corresponds to the base station in the present disclosure.

In one embodiment, the UE 201 supports MIMO wireless communication.

In one embodiment, the gNB 203 supports MIMO wireless communication.

Embodiment 3

Figure 3:
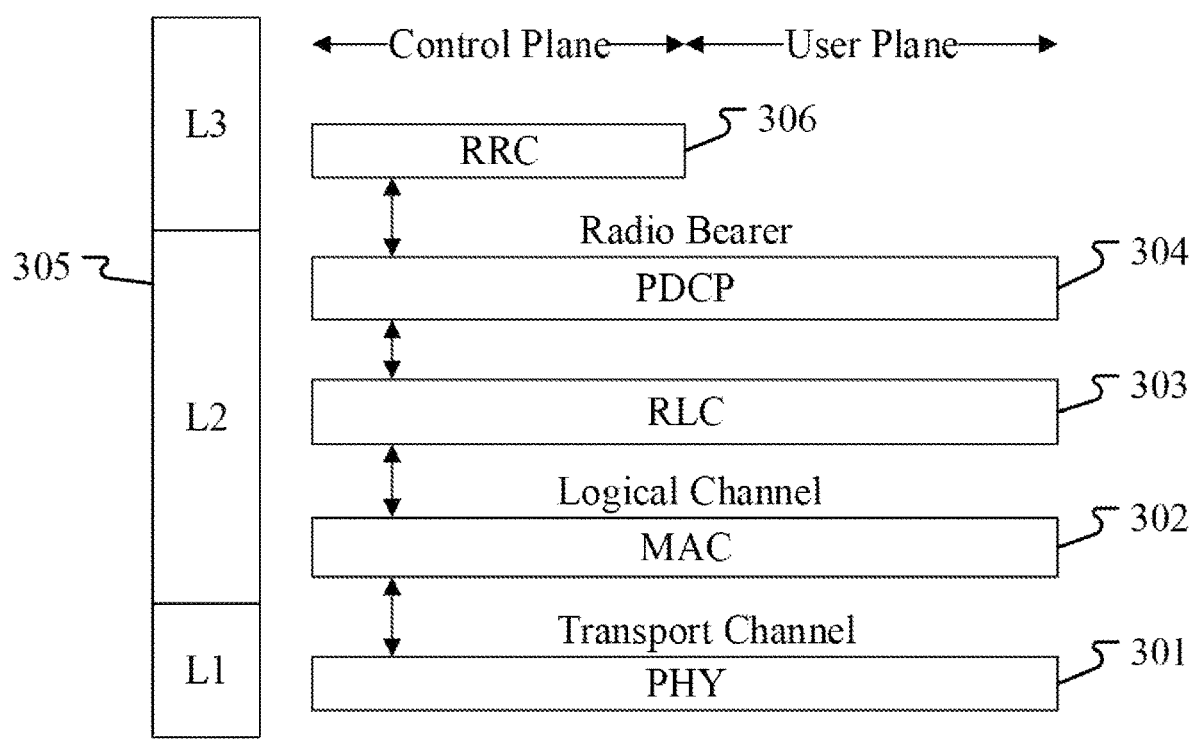
FIG. 3 illustrates a schematic diagram of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating a radio protocol architecture of a user plane and a control plane. In FIG. 3, the radio protocol architecture for a UE and abase station (gNB, eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the UE in the present disclosure.

In one embodiment, the radio protocol architecture in FIG. 3 is applicable to the base station in the present disclosure.

In one embodiment, the first signaling in the present disclosure is generated by the PHY 301.

In one embodiment, the first radio signal in the present disclosure is generated by the PHY 301.

In one embodiment, the first information in the present disclosure is generated by the RRC sublayer 306.

In one embodiment, the first information in the present disclosure is generated by the MAC sublayer 302.

Embodiment 4

Figure 4:
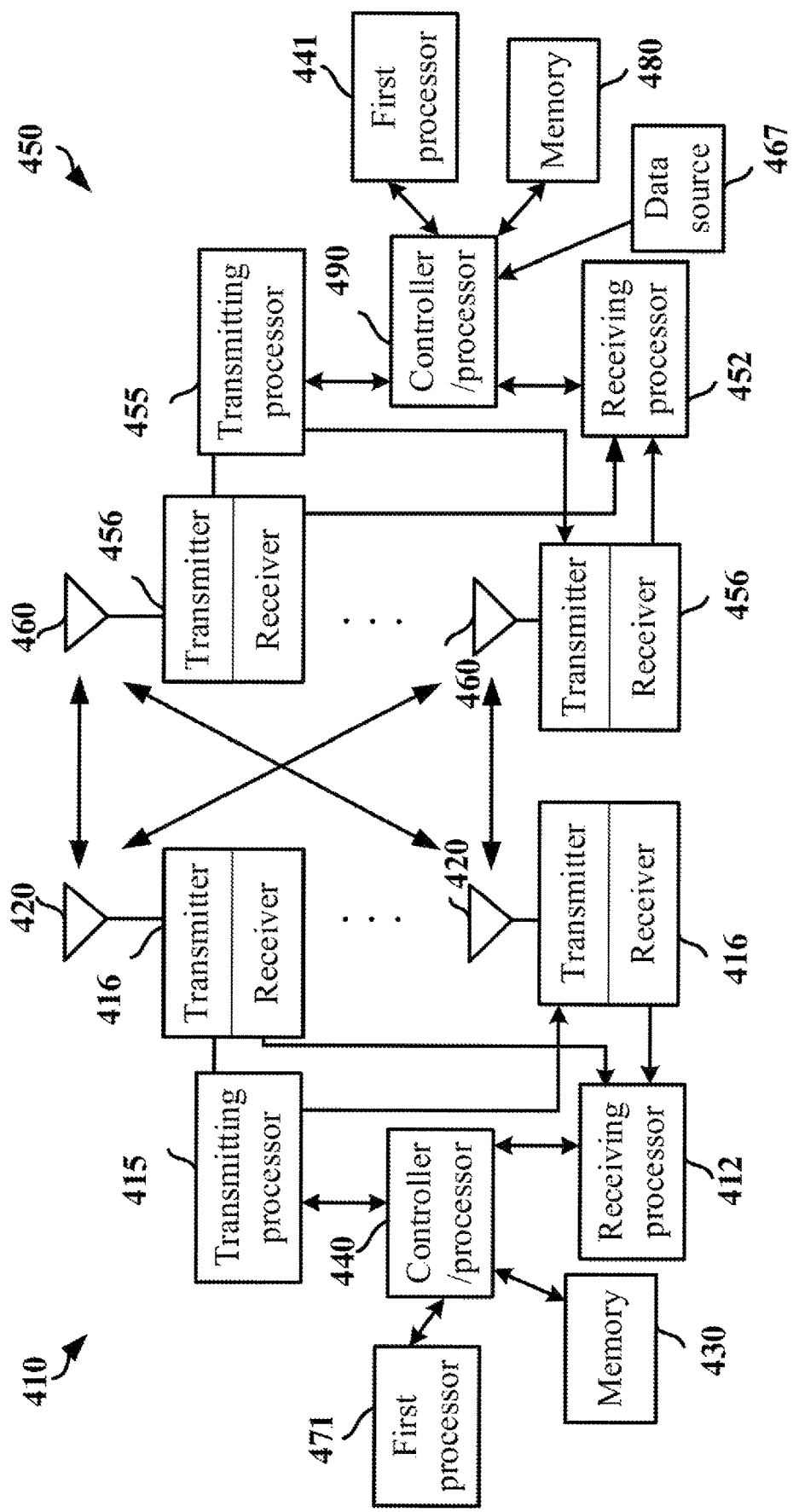
FIG. 4 illustrates a schematic diagram of a NewRadio (NR) node and a UE according to one embodiment of the present disclosure.

Embodiment 4 illustrates a schematic diagram of a base station (NR node) and a UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a first processor 471, a transmitting processor 415, a transmitter/receiver 416 and an antenna 420.

A UE (450) comprises a controller/processor 490, a memory 480, a data source 467, a first processor 441, a transmitting processor 455, a receiving processor 452, a transmitter/receiver 456 and an antenna 460.

In downlink (DL) transmission, processes relevant to the base station (410) include the following:

A higher layer packet is provided to the controller/processor 440, which then provides header compression, encryption, packet segmentation and reordering, and multiplexing and demultiplexing between a logical channel and a transport channel so as to implements the L2 protocols used for the user plane and the control plane; the higher layer packet may comprise data or control information, for example, a Downlink Shared Channel (DL-SCH);

the controller/processor 440 is associated with the memory 430 that stores program code and data, the memory 430 may be a computer readable medium;

the controller/processor 440 comprises scheduling units for transmission requests, wherein the scheduling units schedule radio resources corresponding to transmission requests;

the first processor 471 determines to transmit a first signaling;

the first processor 471 determines to execute a first radio signal in K time domain resource(s), the executing action is transmitting;

the transmitting processor 415 receives a bit stream output from the controller/processor 440 to perform signal transmitting processing functions for the L1 (that is, PHY), including coding, interleaving, scrambling, modulation, power control/allocation and generation of physical layer control signaling (such as PBCH,PDCCH,PHICH,PCFICH, and reference signal);

the transmitting processor 415 receives a bit stream output from the controller/processor 440 to perform signal transmitting processing functions for the L1 (that is, PHY), including multi-antenna transmission, spreading, code division multiplexing, and precoding;

the transmitter 416 is configured to convert a baseband signal provided by the transmitting processor 415 into a radio frequency signal to be transmitted via the antenna 420; each transmitter 416 performs sampling processing on respective input symbol streams to obtain respective sampled signal streams. Each transmitter 416 performs further processing (for example, digital-to-analogue conversion, amplification, filtering, upconversion, etc.) on respective sampled streams to obtain a downlink signal.

In DL transmission, processes relevant to the UE (450) include the following:

The receiver 456 is configured to convert the radio frequency signal received by the antenna 460 into a baseband signal and provide the baseband signal to the receiving processor 452;

the receiving processor 452 implements various signal receiving processing functions used for the L1 layer (that is, PHY), including decoding, deinterleaving, descrambling, demodulation and extraction of physical layer control signaling;

the receiving processor 452 implements various signal receiving processing functions used for the L1 layer (that is, PHY), including multi-antenna reception, despreading, code division multiplexing, and precoding;

the first processor 441 determines to receive a first signaling;

the first processor 441 determines to operate a first radio signal in the K time domain resource(s), the operating action is receiving;

the controller/processor 490 receives a bit stream output from the receiving processor 452, provides header decompression, decryption, packet segmentation and reordering as well as a multiplexing and demultiplexing between a logical channel and a transport channel so as to implement the L2 layer protocols for the user plane and the control plane;

the controller/processor 490 is associated with the memory 480 that stores program codes and data. The memory 480 may be called a computer readable medium.

In uplink (UL) transmission, processes relevant to the base station (410) include the following:

The receiver 416 receives a radio frequency signal via a corresponding antenna 420, converts the received radio frequency signal into a baseband signal, and provides the baseband signal to the receiving processor 412;

the receiving processor 412 performs various signal receiving processing functions for the L1 layer (that is, PHY), including decoding, deinterleaving, descrambling, demodulation and extraction of physical layer control signaling;

the receiving processor 412 performs various signal receiving processing functions for the L1 layer (that is, PHY), including multi-antenna reception, despreading, code division multiplexing, and precoding;

the controller/processor 440 implements the functionality of the L2 layer, and is associated with the memory 430 that stores program codes and data;

the controller/processor 440 provides demultiplexing between a transport channel and a logical channel, packet reassembling, decryption, header decompression, and control signal processing to recover a higher layer packet coming from the UE 450; a higher layer packet from the controller/processor 440 can be provided to the core network;

the first processor 471 determines to execute a first radio signal in the K time domain resource(s), the executing action is receiving.

In UL transmission, processes relevant to the UE (450) include the following:

The data source 467 provides a higher layer packet to the controller/processor 490. The data source 467 represents all protocol layers above the L2 layer;

the transmitter 456 transmits a radio frequency signal via a corresponding antenna 460, converting the baseband signal into a radio frequency signal, and providing the radio frequency signal to a corresponding antenna 460;

the transmitting processor 455 performs various signal receiving processing functions for the L1 layer (that is, PHY), including coding, interleaving, scrambling, modulation and physical layer signaling generation;

the transmitting processor 455 performs various signal receiving processing functions for the L1 layer (that is, PHY), including multi-antenna transmission, spreading, code division multiplexing, and precoding;

the controller/processor 490 performs based on radio resource allocation for the gNB 410 header compression, encryption, packet segmentation and reordering and multiplexing between a logical channel and a transport channel, so as to implement the L2 functionality used for the user plane and the control plane;

the controller/processor 490 is also in charge of HARQ operation, retransmission of a lost packet, and a signaling to the gNB 410;

the first processor 441 determines to operate a first radio signal in the K time domain resource(s), the operating action is transmitting.

In one embodiment, the UE 450 comprises at least one processor and at least one memory. The at least one memory comprises computer program codes; the at least one memory and the computer program codes are configured to be used in collaboration with the at least one processor. The UE 450 at least receives a first signaling, the first signaling being used to determine K time domain resource(s), K being a positive integer; and operates a first radio signal in the K time domain resource(s); herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

In one embodiment, the UE 450 comprises a memory that stores a computer readable instruction program. The computer readable instruction program generates an action when executed by at least one processor. The action includes receiving a first signaling, the first signaling being used to determine K time domain resource(s), K being a positive integer; and operating a first radio signal in the K time domain resource(s); herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

In one embodiment, the gNB 410 comprises at least one processor and at least one memory. The at least one memory comprises computer program codes. The at least one memory and the computer program codes are configured to be used in collaboration with the at least one processor. The gNB 410 at least transmits a first signaling, the first signaling being used to determine K time domain resource(s), K being a positive integer; and executes a first radio signal in the K time domain resource(s); herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the executing is receiving, or, the executing is transmitting.

In one embodiment, the gNB 410 comprises a memory that stores a computer readable instruction program. The computer readable instruction program generates an action when executed by at least one processor. The action includes transmitting a first signaling, the first signaling being used to determine K time domain resource(s), K being a positive integer; and executing a first radio signal in the K time domain resource(s); herein, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the executing is receiving, or, the executing is transmitting.

In one embodiment, the UE 450 corresponds to the UE in the present disclosure.

In one embodiment, the gNB 410 corresponds to the base station in the present disclosure.

In one embodiment, at least the first three of the receiver 456, the receiving processor 452, the first processor 441 and the controller/processor 490 are used to receive the first signaling in the present disclosure.

In one embodiment, at least the first three of the transmitter 416, the transmitting processor 415, the first processor 471 and the controller/processor 440 are used to transmit the first signaling in the present disclosure.

In one embodiment, at least the first three of the receiver 456, the receiving processor 452, the first processor 441 and the controller/processor 490 are used to receive the first information in the present disclosure.

In one embodiment, at least the first three of the transmitter 416, the transmitting processor 415, the first processor 471 and the controller/processor 440 are used to transmit the first information in the present disclosure.

In one embodiment, at least the first three of the receiver 456, the receiving processor 452, the first processor 441 and the controller/processor 490 are used to operate the first radio signal of the present disclosure in the K time domain resource(s) of the present disclosure, the operating action is receiving.

In one embodiment, at least the first three of the transmitter 416, the transmitting processor 415, the first processor 471 and the controller/processor 440 are used to execute the first radio signal of the present disclosure in the K time domain resource(s) of the present disclosure, the executing action is transmitting.

In one embodiment, at least the first three of the transmitter 456, the transmitting processor 455, the first processor 441 and the controller/processor 490 are used to operate the first radio signal of the present disclosure in the K time domain resource(s) of the present disclosure, the operating action is transmitting.

In one embodiment, at least the first three of the receiver 416, the receiving processor 412, the first processor 471 and the controller/processor 440 are used to execute the first radio signal of the present disclosure in the K time domain resource(s) of the present disclosure, the executing action is receiving.

In one embodiment, at least the first four of the transmitter/receiver 456, the transmitting processor 455, the receiving processor 452, the first processor 441 and the controller/processor 490 are used to operate the first radio signal of the present disclosure in the K time domain resource(s) of the present disclosure; the operating action is transmitting, or, the operating action is receiving.

In one embodiment, at least the first four of the transmitter/receiver 416, the transmitting processor 415, the receiving processor 412, the first processor 471 and the controller/processor 440 are used to execute the first radio signal of the present disclosure in the K time domain resource(s) of the present disclosure; the executing action is receiving, or, the executing action is transmitting.

Embodiment 5

Figure 5:
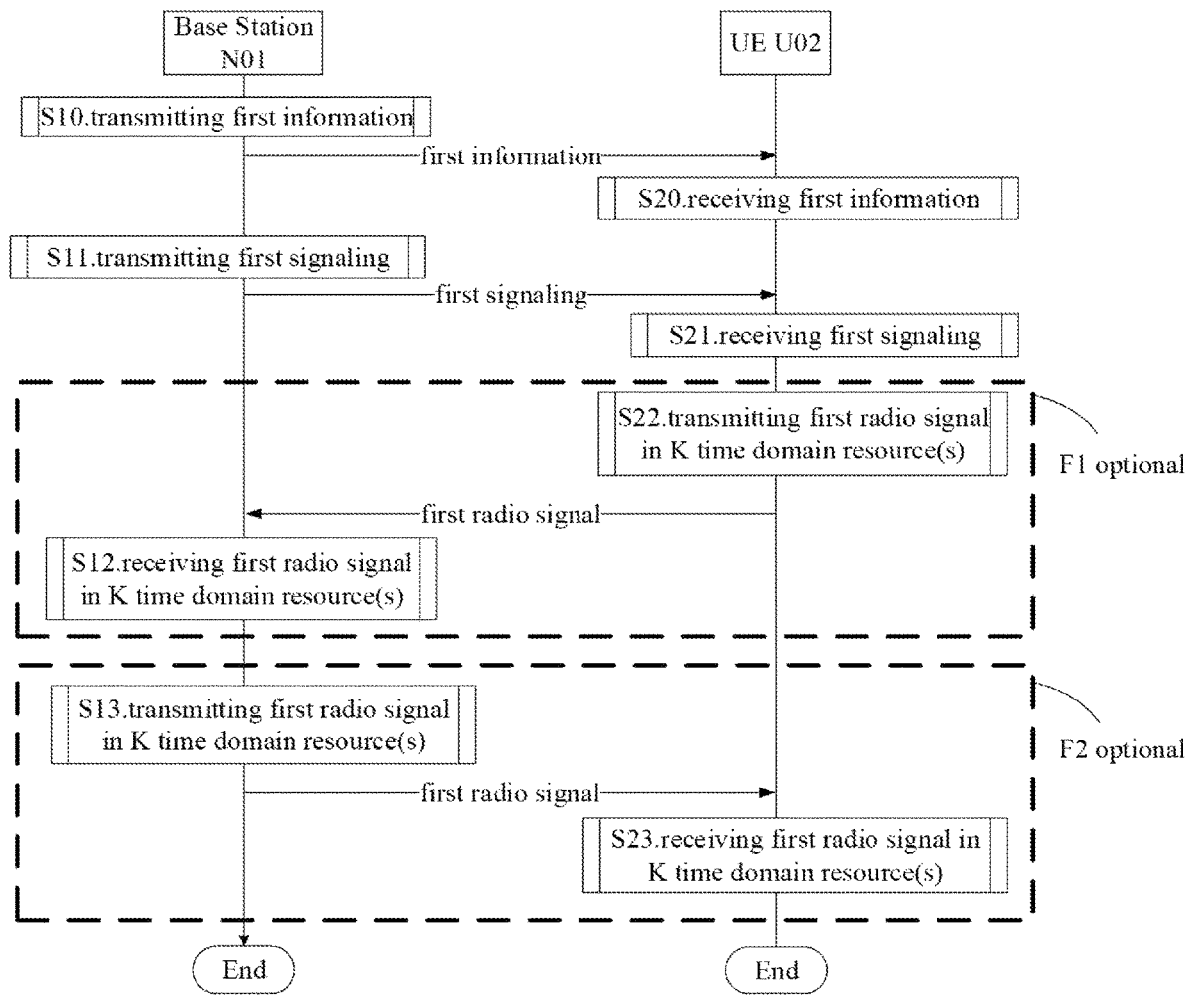
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U01. In FIG. 5, only one of box F1 and box F2 exists.

The N01 transmits first information in step S10; transmits a first signaling in step S11; receives a first radio signal in K time domain resource(s) in step S12; and transmits the first radio signal in the K time domain resource(s) in step S13.

The U02 receives first information in step S20; receives a first signaling in step S21; transmits a first radio signal in K time domain resource(s) in step S22; and receives the first radio signal in the K time domain resource(s) in step S23.

In Embodiment 5, the first signaling is used by the U02 to determine K time domain resource(s), K being a positive integer; the first radio signal carries a first bit block, a first time-domain-resource size and a target parameter are used by the U02 to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K. The first information indicates the first parameter.

In one embodiment, between the box F1 and the box F2 only F1 exists; the U02 operates a first radio signal in the K time domain resource(s), while the N01 executes the first radio signal in the K time domain resource(s), the operating action is transmitting and the executing action is receiving.

In one embodiment, between the box F1 and the box F2 only F2 exists; the N01 executes a first radio signal in the K time domain resource(s), while the U02 operates the first radio signal in the K time domain resource(s), the executing action is transmitting and the operating action is receiving.

In one embodiment, the first information is semi-statically configured.

In one embodiment, the first information is carried by a higher layer signaling.

In one embodiment, the first information is carried by an RRC signaling.

In one embodiment, the first information is carried by a MAC CE signaling.

In one embodiment, the first information comprises one or more Information Elements (IEs) of an RRC signaling.

In one embodiment, the first information comprises all or part of an IE of an RRC signaling.

In one embodiment, the first information comprises part of fields of an IE of an RRC signaling.

In one embodiment, the first information comprises a plurality of IEs of an RRC signaling.

In one embodiment, the first information indicates the first parameter and the second parameter.

In one embodiment, the first parameter and a first coefficient are used by the U02 to determine the second parameter. The first information indicates the first parameter and the first coefficient.

In one subembodiment, the second parameter is equal to a product of the first parameter and the first coefficient.

In one subembodiment, the second parameter is equal to an integer obtained after floor operation of a product of the first parameter and the first coefficient.

In one subembodiment, the second parameter is equal to an integer obtained after ceiling operation of a product of the first parameter and the first coefficient.

In one subembodiment, the second parameter is equal to a maximum integer no greater than a product of the first parameter and the first coefficient.

In one subembodiment, the second parameter is equal to a minimum integer no less than a product of the first parameter and the first coefficient.

In one subembodiment, the first coefficient is a positive real number less than 1.

In one embodiment, the first parameter and a second coefficient are used by the U02 to determine the second parameter. The first information indicates the first parameter and the second coefficient.

In one subembodiment, the second parameter is equal to a product of the first parameter and the second coefficient.

In one subembodiment, the second parameter is equal to an integer obtained after floor operation of a product of the first parameter and the second coefficient.

In one subembodiment, the second parameter is equal to an integer obtained after ceiling operation of a product of the first parameter and the second coefficient.

In one subembodiment, the second parameter is equal to a maximum integer no greater than a product of the first parameter and the second coefficient.

In one subembodiment, the second parameter is equal to a minimum integer no less than a product of the first parameter and the second coefficient.

In one subembodiment, the second coefficient is a positive real number greater than 1.

In one embodiment, a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

In one embodiment, relative magnitude of the first time-domain-resource size and a first threshold is used to determine the target parameter between the first parameter and the second parameter, the first threshold is a positive integer.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to size of one of the K time domain resources, the target parameter is the second parameter.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to a sum of sizes respectively corresponding to the K time domain resources, the target parameter is the second parameter.

In one embodiment, the K is greater than 1, and the K is used by the U02 to determine the second parameter.

In one embodiment, the K is greater than 1, the first radio signal comprises K sub-signals, the K sub-signals are respectively transmitted in the K time domain resources, each of the K sub-signals carrying the first bit block.

In one embodiment, the above method also comprises:

receiving first information;

herein, the first information indicates the first parameter.

Embodiment 6

Figure 6:
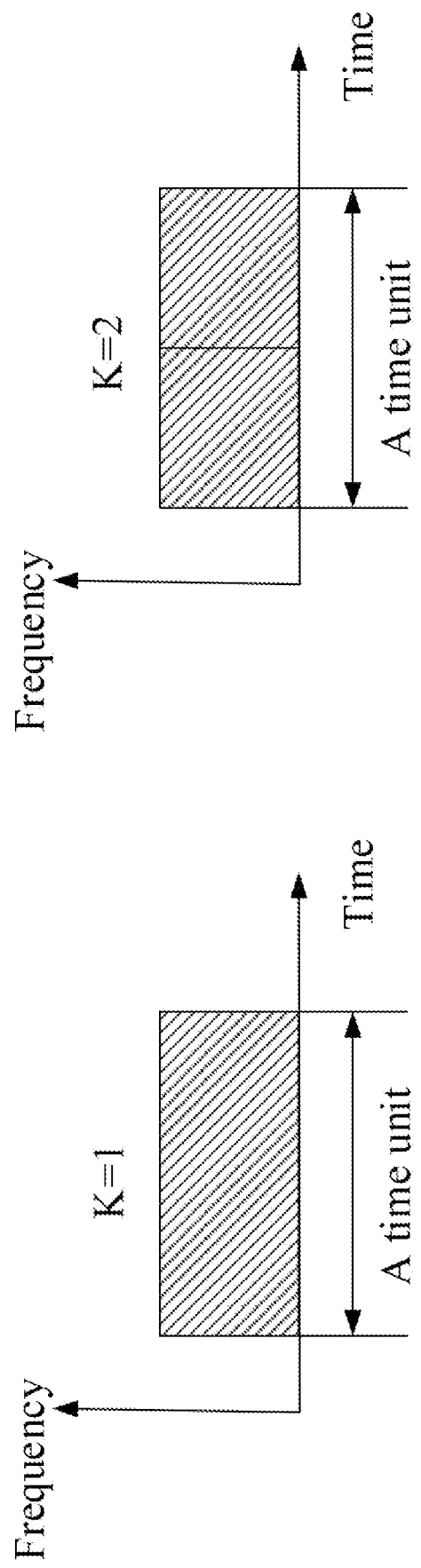
FIG. 6 illustrates a schematic diagram of determining K according to one embodiment of the present disclosure.

Embodiment 6 illustrates a schematic diagram of determining K, as shown in FIG. 6.

In Embodiment 6, the K is a number of transmission(s) of the first bit block of the present disclosure within a time unit.

In one embodiment, the K is equal to 1, a first time-domain-resource size is size of the K time domain resource.

In one embodiment, the K is equal to 1, the K time domain resource belongs to a time unit.

In one embodiment, the K is equal to 1, the K time domain resource is used for a transmission of the first bit block.

In one embodiment, the K is equal to 1, the K time domain resource is used for a redundancy version of transmission of the first bit block.

In one embodiment, the K is equal to 1, the K time domain resource is used for one of S repetitions of transmissions of the first bit block; the S repetitions of transmissions of the first bit block are respectively performed in S time units, any two of the S time units are orthogonal (non-overlapped); the S is a positive integer greater than 1.

In one embodiment, the K is equal to 1, the K time domain resource is used for one of S redundancy versions of transmission of the first bit block; the S redundancy versions of transmission of the first bit block are respectively performed in S time units, any two of the S time units are orthogonal (non-overlapped); the S is a positive integer greater than 1.

In one embodiment, the K is greater than 1, the first time-domain-resource size is the size of one of the K time domain resources.

In one embodiment, the K is greater than 1, the first time-domain-resource size is the size of an earliest time domain resource of the K time domain resources.

In one embodiment, the K is greater than 1, the first time-domain-resource size is a smallest value out of values respectively corresponding to the K time domain resources.

In one embodiment, the K is greater than 1, the first time-domain-resource size is a greatest value out of values respectively corresponding to the K time domain resources.

In one embodiment, the K is greater than 1, the K time domain resources belong to a same time unit.

In one embodiment, the K is greater than 1, the K time domain resources are respectively used for K repetitions of transmissions of the first bit block.

In one embodiment, the K is greater than 1, the K time domain resources are respectively used for K redundancy versions of transmission of the first bit block.

In one embodiment, the K is greater than 1, K0 time domain resources are respectively used for K0 repetitions of transmissions of the first bit block, any one of the K time domain resources is one of the K0 time domain resources, any two of the K0 time domain resources are orthogonal (non-overlapped), K0 is a positive integer greater than the K; any one of the K0 time domain resources that does not belong to the K time domain resources is orthogonal (non-overlapping) with a time unit to which the K time domain resources belong.

In one embodiment, the K is greater than 1, K0 time domain resources are respectively used for K0 redundancy versions of transmission of the first bit block, any one of the K time domain resources is one of the K0 time domain resources, any two of the K0 time domain resources are orthogonal (non-overlapped), K0 is a positive integer greater than the K; any one of the K0 time domain resources that does not belong to the K time domain resources is orthogonal (non-overlapping) with a time unit to which the K time domain resources belong.

In one embodiment, the K is a number of transmission(s) of the first bit block of the present disclosure within a time unit, the first parameter is greater than the second parameter in the present disclosure.

In one embodiment, the time unit comprises a positive integer number of consecutive multicarrier symbols.

In one embodiment, the time unit comprises 14 consecutive multicarrier symbols.

In one embodiment, the time unit comprises a positive integer number of slot(s).

In one embodiment, the time unit comprises a positive integer number of subframe(s).

In one embodiment, the time unit comprises a slot.

In one embodiment, the time unit comprises a subframe.

In one embodiment, the phrase that two time units are orthogonal means that the two time units do not comprise a same multicarrier symbol.

In one embodiment, the phrase that two time units are orthogonal means that any multicarrier symbol in one of the two time units does not belong to the other one of the two time units.

In one embodiment, the phrase that two time units are orthogonal means that there isn't any multicarrier symbol belonging to both of the two time units.

In one embodiment, the phrase that two time units are orthogonal means that an end of one of the two time units is earlier than a start of the other one of the two time units.

Embodiment 7

Figure 7:
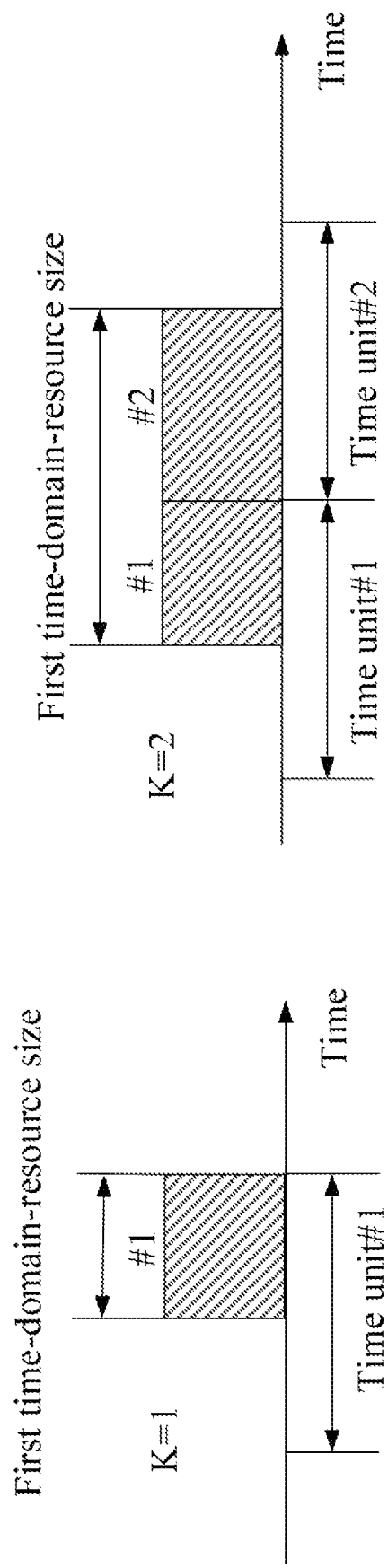
FIG. 7 illustrates a schematic diagram of determining K according to another embodiment of the present disclosure.

Embodiment 7 illustrates another schematic diagram of determining K, as shown in FIG. 7.

In Embodiment 7, the K is a number of time unit(s) to which time domain resources used to determine the first time-domain-resource size of the present disclosure belong.

In one embodiment, the K is equal to 1, the first time-domain-resource size is the size of the K time domain resource.

In one embodiment, the K is equal to 1, the K time domain resource belongs to a time unit.

In one embodiment, the K is equal to 1, the K time domain resource is used for a transmission of the first bit block.

In one embodiment, the K is equal to 1, the K time domain resource is used for a redundancy version of transmission of the first bit block.

In one embodiment, the K is equal to 1, the K time domain resource is used for one of S repetitions of transmissions of the first bit block; the S repetitions of transmissions of the first bit block are respectively performed in S time units, any two of the S time units are orthogonal (non-overlapped); the S is a positive integer greater than 1.

In one embodiment, the K is equal to 1, the K time domain resource is used for one of S redundancy versions of transmission of the first bit block; the S redundancy versions of transmission of the first bit block are respectively performed in S time units, any two of the S time units are orthogonal (non-overlapped); the S is a positive integer greater than 1.

In one embodiment, the K is greater than 1, the K time domain resources are jointly used to determine the first time-domain-resource size.

In one embodiment, the K is greater than 1, the first time-domain-resource size is a sum of sizes respectively corresponding to the K time domain resources.

In one embodiment, the K is greater than 1, the K time domain resources belong to K time units respectively, any two of the K time units are orthogonal (non-overlapped).

In one embodiment, the K is greater than 1, the K time domain resources are respectively used for K repetitions of transmissions of the first bit block.

In one embodiment, the K is greater than 1, the K time domain resources are respectively used for K redundancy versions of transmission of the first bit block.

In one embodiment, the first parameter is less than the second parameter.

Embodiment 8

Figure 8:
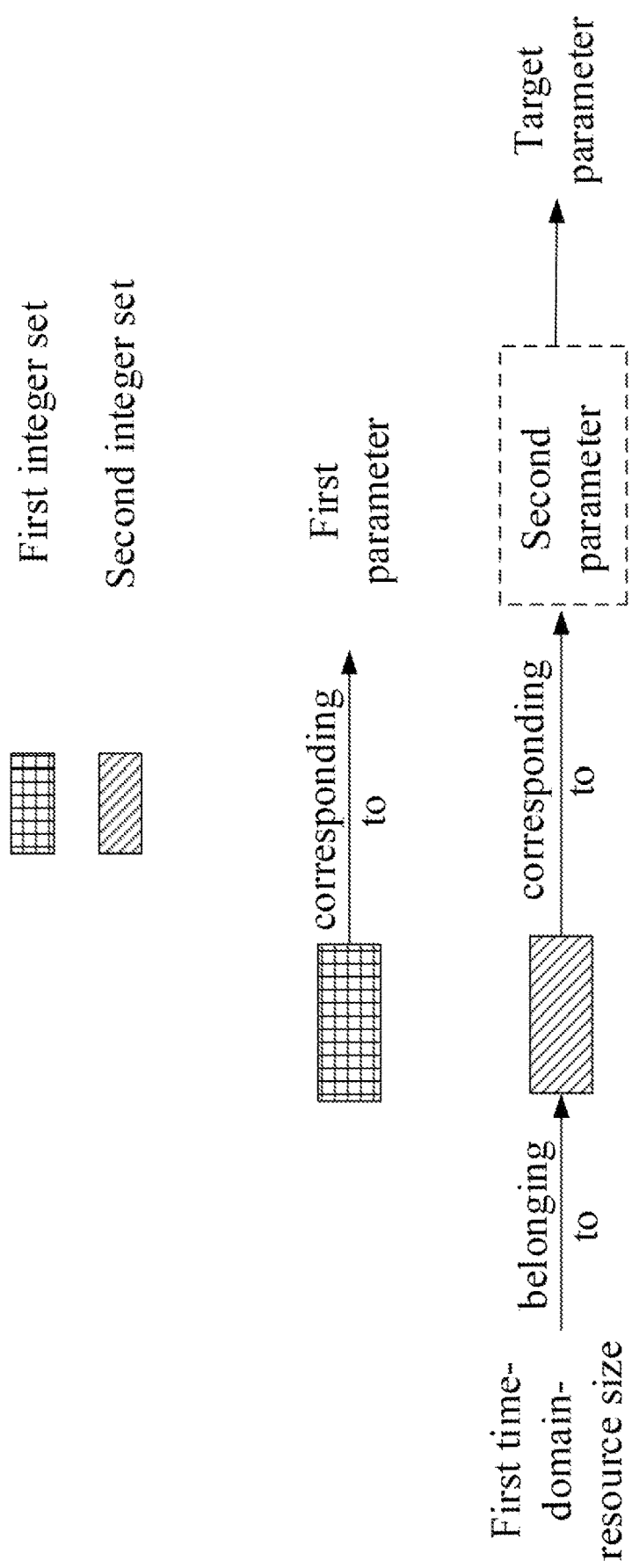
FIG. 8 illustrates a schematic diagram of a target parameter being related to a first time-domain-resource size according to one embodiment of the present disclosure.

Embodiment 8 illustrates a schematic diagram of a target parameter being related to a first time-domain-resource size, as shown in FIG. 8.

In Embodiment 8, a first integer set corresponds to the first parameter in the present disclosure, and a second integer set corresponds to the second parameter in the present disclosure, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

In one embodiment, a maximum positive integer in the second integer set is less than a minimum positive integer in the first integer set. The second parameter is less than the first parameter.

In one embodiment, a minimum positive integer in the second integer set is greater than a maximum positive integer in the first integer set. The second parameter is greater than the first parameter.

Embodiment 9

Figure 9:
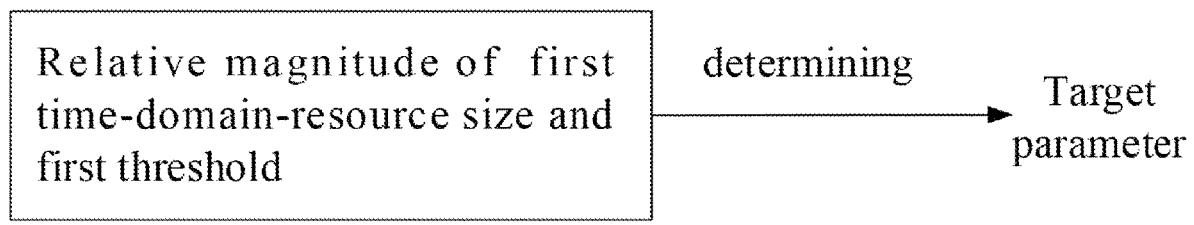
FIG. 9 illustrates a schematic diagram of a target parameter being related to a first time-domain-resource size according to another embodiment of the present disclosure.

Embodiment 9 illustrates another schematic diagram of a target parameter being related to a first time-domain-resource size, as shown in FIG. 9.

In Embodiment 9, relative magnitude of the first time-domain-resource size and a first threshold is used to determine the target parameter between the first parameter and the second parameter, the first threshold is a positive integer.

In one embodiment, when the first time-domain-resource size is greater than the first threshold, the target parameter is the first parameter; when the first time-domain-resource size is less than the first threshold, the target parameter is the second parameter; the second parameter is less than the first parameter.

In one subembodiment of the above embodiment, when the first time-domain-resource size is equal to the first threshold, the target parameter is the first parameter.

In one subembodiment of the above embodiment, when the first time-domain-resource size is equal to the first threshold, the target parameter is the second parameter.

In one subembodiment of the above embodiment, the first threshold is no lea than 4.

In one subembodiment of the above embodiment, the first threshold is no less than 2.

In one subembodiment of the above embodiment, the first threshold is no less than 1.

In one subembodiment of the above embodiment, the first threshold is equal to 4.

In one subembodiment of the above embodiment, the first threshold is equal to 2.

In one subembodiment of the above embodiment, the first threshold is equal to 1.

In one embodiment, when the first time-domain-resource size is greater than the first threshold and is less than a third threshold, the target parameter is the first parameter; when the first time-domain-resource size is less than the first threshold, the target parameter is the second parameter; the second parameter is less than the first parameter; the third threshold is a positive integer, and the third threshold is greater than the first threshold.

In one subembodiment, when the first time-domain-resource size is equal to the first threshold, the target parameter is the first parameter.

In one subembodiment, when the first time-domain-resource size is equal to the first threshold, the target parameter is the second parameter.

In one subembodiment of the above embodiment, the first threshold is no less than 4.

In one subembodiment of the above embodiment, the first threshold is no less than 2.

In one subembodiment of the above embodiment, the first threshold is no less than 1.

In one subembodiment of the above embodiment, the first threshold is equal to 4.

In one subembodiment of the above embodiment, the first threshold is equal to 2.

In one subembodiment of the above embodiment, the first threshold is equal to 1.

In one subembodiment of the above embodiment, the third threshold is no less than 14.

In one subembodiment of the above embodiment, the third threshold is no less than 7.

In one subembodiment of the above embodiment, the third threshold is equal to 14.

In one subembodiment of the above embodiment, the third threshold is equal to 7.

In one embodiment, when the first time-domain-resource size is less than the first threshold, the target parameter is the first parameter; when the first time-domain-resource size is greater than the first threshold, the target parameter is the second parameter; the second parameter is greater than the first parameter.

In one subembodiment of the above embodiment, the second parameter is greater than the first parameter.

In one subembodiment of the above embodiment, the first threshold is no less than 14.

In one subembodiment of the above embodiment, the first threshold is no less than 7.

In one subembodiment of the above embodiment, the first threshold is equal to 14.

In one subembodiment of the above embodiment, the first threshold is equal to 7.

In one embodiment, when the first time-domain-resource size is less than the first threshold and is greater than the second threshold, the target parameter is the first parameter; when the first time-domain-resource size is greater than the first threshold, the target parameter is the second parameter; the second parameter is greater than the first parameter; the second threshold is a positive integer, and the second threshold is less than the first threshold.

In one subembodiment of the above embodiment, the second parameter is greater than the first parameter.

In one subembodiment of the above embodiment, the first threshold is no less than 14.

In one subembodiment of the above embodiment, the first threshold is no less than 7.

In one subembodiment of the above embodiment, the first threshold is equal to 14.

In one subembodiment of the above embodiment, the first threshold is equal to 7.

In one subembodiment of the above embodiment, the second threshold is no less than 4.

In one subembodiment of the above embodiment, the second threshold is no less than 2.

In one subembodiment of the above embodiment, the second threshold is no less than 1.

In one subembodiment of the above embodiment, the second threshold is equal to 4.

In one subembodiment of the above embodiment, the second threshold is equal to 2.

In one subembodiment of the above embodiment, the second threshold is equal to 1.

Embodiment 10

Figure 10:
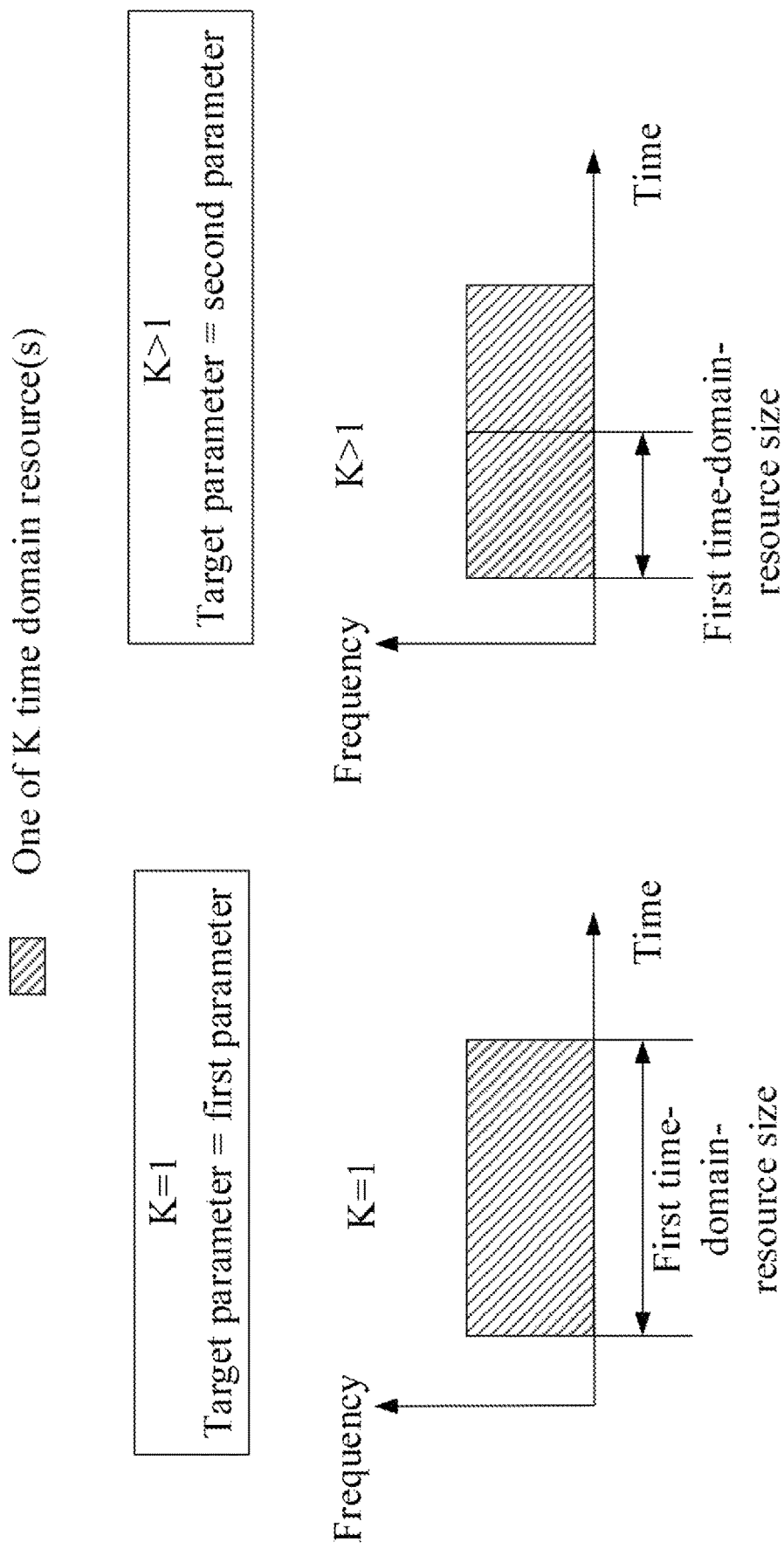
FIG. 10 illustrates a schematic diagram of a target parameter being related to K according to one embodiment of the present disclosure.

Embodiment 10 illustrates a schematic diagram of a target parameter being related to K, as shown in FIG. 10.

In Embodiment 10, when the K is equal to 1, the first time-domain-resource size in the present disclosure is the size of the K time domain resource in the present disclosure, the target parameter is the first parameter in the present disclosure; when the K is greater than 1, the K time domain resources are mutually orthogonal, the first time-domain-resource size is size of one of the K time domain resources, the target parameter is the second parameter in the present disclosure.

In one embodiment, the second parameter is less than the first parameter.

In one embodiment, the second parameter is pre-defined.

In one embodiment, the second parameter is configurable.

In one embodiment, the second parameter is configured by a higher layer signaling.

In one embodiment, the second parameter is configured by an RRC signaling.

In one embodiment, the first information indicates the first parameter and the second parameter.

In one embodiment, the first parameter is used to determine the second parameter.

In one embodiment, the first parameter and a first coefficient are used to determine the second parameter.

In one subembodiment, the second parameter is equal to a product of the first parameter and the first coefficient.

In one subembodiment, the second parameter is equal to an integer obtained after floor operation of a product of the first parameter and the first coefficient.

In one subembodiment, the second parameter is equal to an integer obtained after ceiling operation of a product of the first parameter and the first coefficient.

In one subembodiment, the second parameter is equal to a maximum integer no greater than a product of the first parameter and the first coefficient.

In one subembodiment, the second parameter is equal to a minimum integer no less than a product of the first parameter and the first coefficient.

In one subembodiment, the first coefficient is a positive real number less than 1.

In one subembodiment, the first coefficient is pre-defined.

In one subembodiment, the first coefficient is configurable.

In one subembodiment, the first coefficient is configured by a higher layer signaling.

In one subembodiment, the first coefficient is configured by an RRC signaling.

In one subembodiment, the first information indicates the first parameter and the first coefficient.

In one embodiment, the K is greater than 1; the K is used to determine the second parameter.

In one embodiment, the K is greater than 1; the first parameter and the K are together used to determine the second parameter.

In one subembodiment, the second parameter is equal to a quotient of the first parameter divided by the K.

In one subembodiment, the second parameter is equal to an integer obtained after floor operation of a quotient of the first parameter divided by the K.

In one subembodiment, the second parameter is equal to a maximum integer no greater than a quotient of the first parameter divided by the K.

In one subembodiment, the second parameter is equal to a minimum integer no less than a quotient of the first parameter divided by the K.

In one embodiment, the K is a number of transmissions of the first bit block within a time unit.

In one embodiment, the K time domain resource(s) belongs(belong) to a time unit.

In one subembodiment, the K is equal to 1.

In one subembodiment, the K is greater than 1.

In one embodiment, the K is equal to 1, the K time domain resource is used for a transmission of the first bit block.

In one embodiment, the K is equal to 1, the K time domain resource is used for a redundancy version of transmission of the first bit block.

In one embodiment, the K is equal to 1, the K time domain resource is used for one of S repetitions of transmissions of the first bit block; the S repetitions of transmissions of the first bit block are respectively performed in S time units, and the K time domain resources belong to one of the S time units, any two of the S time units are orthogonal (non-overlapped); the S is a positive integer greater than 1.

In one subembodiment of the above embodiment, the S is pre-defined or configurable.

In one subembodiment of the above embodiment, the S is configured by a higher layer signaling.

In one subembodiment of the above embodiment, the S is configured by an RRC signaling.

In one subembodiment of the above embodiment, the S is 2.

In one subembodiment of the above embodiment, the S is 4.

In one subembodiment of the above embodiment, the S is 8.

In one subembodiment of the above embodiment, the S is one of positive integers from 2, 4 to 8.

In one subembodiment of the above embodiment, the operating is receiving. The S is indicated by a pdsch-AggregationFactorfield in a PDSCH-Config IE of an RRC signaling, the specific meaning of the PDSCH-Config IE and the pdsch-AggregationFactor field can be found in 3GPPTS38.331, section 6.3.2.

In one subembodiment of the above embodiment, the operating is transmitting. The S is indicated by a pusch-AggregationFactorfield in a PUSCH-Config IE of an RRC signaling, the specific meaning of the PUSCH-Config IE and the pusch-AggregationFactor field can be found in 3GPPTS38.331, section 6.3.2.

In one embodiment, the K is equal to 1, the K time domain resource is used for one of S repetitions of transmissions of the first bit block; the S repetitions of transmissions of the first bit block are respectively performed in S time units, any two of the S time units are orthogonal (non-overlapped); the S is a positive integer greater than 1.

In one subembodiment, two of the S redundancy versions are different.

In one subembodiment, any two of the S redundancy versions are different.

In one subembodiment, the S redundancy versions are the same.

In one subembodiment, the S is pre-defined or can be configured.

In one subembodiment, the S is configured by a higher layer signaling.

In one subembodiment, the S is configured by an RRC signaling.

In one subembodiment, the S is 2.

In one subembodiment, the S is 4.

In one subembodiment, the S is 8.

In one subembodiment, the S is a positive integer out of 2, 4 and 8.

In one subembodiment, the operating is receiving. The S is indicated by a pdsch-AggregationFactor field in a PDSCH-Config IE of an RRC signaling, the specific meaning of the PDSCH-Config IE and the pdsch-AggregationFactor can be found in 3GPPTS38.331, section 6.3.2.

In one subembodiment, the operating is transmitting. The S is indicated by a pusch-AggregationFactor field in a PUSCH-Config IE of an RRC signaling, the specific meaning of the PUSCH-Config IE and the pusch-AggregationFactor can be found in 3GPPTS38.331, section 6.3.2.

In one embodiment, the K is greater than 1, the first time-domain-resource size is the size of an earliest time domain resource of the K time domain resources.

In one embodiment, the K is greater than 1, the first time-domain-resource size is a smallest value out of values respectively corresponding to the K time domain resources.

In one embodiment, the K is greater than 1, the first time-domain-resource size is a greatest value out of values respectively corresponding to the K time domain resources.

In one embodiment, the K is greater than 1, the K time domain resources are respectively used for K repetitions of transmissions of the first bit block.

In one embodiment, the K is greater than 1, the K time domain resources are respectively used for K redundancy versions of transmission of the first bit block.

In one subembodiment, two of the K redundancy versions are different.

In one subembodiment, any two of the K redundancy versions are different.

In one subembodiment, the K redundancy versions are the same.

In one embodiment, the K is greater than 1, K0 time domain resources are respectively used for K0 repetitions of transmissions of the first bit block, any one of the K time domain resources is one of the K0 time domain resources, any two of the K0 time domain resources are orthogonal (non-overlapped), K0 is a positive integer greater than the K; any one of the K0 time domain resources that does not belong to the K time domain resources is orthogonal (non-overlapping) with a time unit to which the K time domain resources belong.

In one embodiment, the K is greater than 1, K0 time domain resources are respectively used for K0 redundancy versions of transmission of the first bit block, any one of the K time domain resources is one of the K0 time domain resources, any two of the K0 time domain resources are orthogonal (non-overlapped), K0 is a positive integer greater than the K; any one of the K0 time domain resources that does not belong to the K time domain resources is orthogonal (non-overlapping) with a time unit to which the K time domain resources belong.

In one subembodiment, two of the K0 redundancy versions are different.

In one subembodiment, any two of the K0 redundancy versions are different.

In one subembodiment, the K0 redundancy versions are the same.

Embodiment 11

Figure 11:
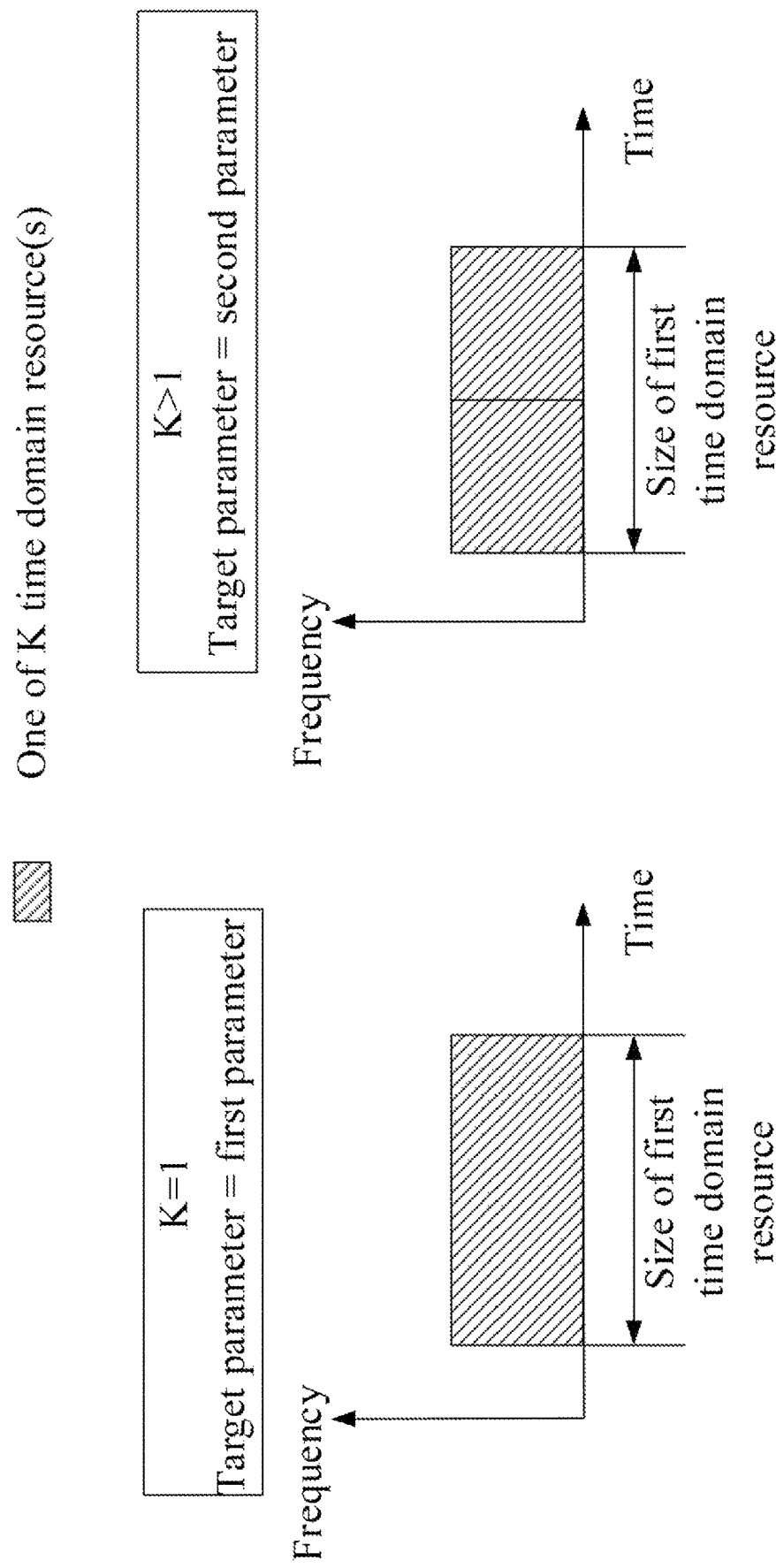
FIG. 11 illustrates a schematic diagram of a target parameter being related to K according to one embodiment of the present disclosure.

Embodiment 11 illustrates another schematic diagram of a target parameter being related to K, as shown in FIG. 11.

In one embodiment, when the K is equal to 1, the first time-domain-resource size is size of the K time domain resource, the target parameter is the first parameter; when the K is greater than 1, the K time domain resources are mutually orthogonal, the first time-domain-resource size is a sum of sizes respectively corresponding to the K time domain resources, the target parameter is the second parameter.

In one embodiment, the second parameter is greater than the first parameter.

In one embodiment, the second parameter is pre-defined.

In one embodiment, the second parameter is configurable.

In one embodiment, the second parameter is configured by a higher layer signaling.

In one embodiment, the second parameter is configured by an RRC signaling.

In one embodiment, the first information indicates the first parameter and the second parameter.

In one embodiment, the first parameter is used to determine the second parameter.

In one embodiment, the first parameter and a second coefficient are used to determine the second parameter.

In one subembodiment, the second parameter is equal to a product of the first parameter and the second coefficient.

In one subembodiment, the second parameter is equal to an integer obtained after floor operation of a product of the first parameter and the second coefficient.

In one subembodiment, the second parameter is equal to an integer obtained after ceiling operation of a product of the first parameter and the second coefficient.

In one subembodiment, the second parameter is equal to a maximum integer no greater than a product of the first parameter and the second coefficient.

In one subembodiment, the second parameter is equal to a minimum integer no less than a product of the first parameter and the second coefficient.

In one subembodiment, the second coefficient is a positive real number greater than 1.

In one subembodiment, the second coefficient is pre-defined.

In one subembodiment, the second coefficient is configurable.

In one subembodiment, the second coefficient is configured by a higher layer signaling.

In one subembodiment, the second coefficient is configured by an RRC signaling.

In one subembodiment, the first information indicates the first parameter and the second coefficient.

In one embodiment, the K is greater than 1, and the K is used to determine the second parameter.

In one embodiment, the K is greater than 1, the first parameter and the K are jointly used to determine the second parameter.

In one subembodiment, the second parameter is equal to a product of the first parameter and the K.

In one embodiment, the K is a number of time unit(s) to which time domain resources used to determine the first time-domain-resource size of the present disclosure belong.

In one embodiment, the K is equal to 1, the K time domain resource belongs to a time unit.

In one embodiment, the K is equal to 1, the K time domain resource is used for a transmission of the first bit block.

In one embodiment, the K is equal to 1, the K time domain resource is used for a redundancy version of transmission of the first bit block.

In one embodiment, the K is equal to 1, the K time domain resource is used for one of S repetitions of transmissions of the first bit block; the S repetitions of transmissions of the first bit block are respectively performed in S time units, and the K time domain resources belong to one of the S time units, any two of the S time units are orthogonal (non-overlapped); the S is a positive integer greater than 1.

In one subembodiment, the S is pre-defined or configurable.

In one subembodiment, the S is configured by a higher layer signaling.

In one subembodiment, the S is configured by an RRC signaling.

In one subembodiment, the S is 2.

In one subembodiment, the S is 4.

In one subembodiment, the S is 8.

In one subembodiment, the S is a positive integer out of 2, 4 and 8.

In one subembodiment, the operating is receiving. The S is indicated by a pdsch-AggregationFactor field in a PDSCH-Config IE of an RRC signaling, the specific meaning of the PDSCH-Config IE and the pdsch-AggregationFactor field can be found in 3GPPTS38.331, section 6.3.2.

In one subembodiment, the operating is transmitting, the S is indicated by aapusch-AggregationFactor field in a PUSCH-Config IE of an RRC signaling, the specific meaning of the PUSCH-Config IE and the pusch-AggregationFactor field can be found in 3GPPTS38.331, section 6.3.2.

In one embodiment, the K is greater than 1, the K time domain resources are jointly used to determine the first time-domain-resource size.

In one embodiment, the K is greater than 1, the K time domain resources respectively belong to K time units, any two of the K time units are orthogonal (non-overlapped).

In one embodiment, the K is greater than 1, the K time domain resources are respectively used for K repetitions of transmissions of the first bit block.

In one embodiment, the K is greater than 1, the K time domain resources are respectively used for K redundancy versions of transmission of the first bit block.

In one subembodiment, two of the K redundancy versions are different.

In one subembodiment, any two of the K redundancy versions are different.

In one subembodiment, two of the K redundancy versions are the same.

Embodiment 12

Figure 12:
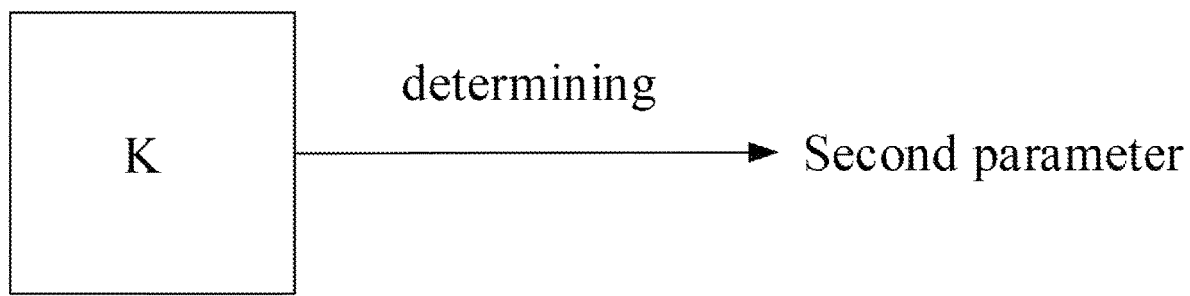
FIG. 12 illustrates a schematic diagram of determining a second parameter according to one embodiment of the present disclosure.

Embodiment 12 illustrates a schematic diagram of determining a second parameter, as shown in FIG. 12.

In Embodiment 12, the K is greater than 1, and the K is used to determine the second parameter.

In one embodiment, the K is greater than 1, the second parameter is less than the first parameter, and the first parameter and the K are together used to determine the second parameter.

In one subembodiment of the above embodiment, the second parameter is equal to a quotient of the first parameter divided by the K.

In one subembodiment, the second parameter is equal to an integer obtained after floor operation of a quotient of the first parameter divided by the K.

In one subembodiment, the second parameter is equal to a maximum integer no greater than a quotient of the first parameter divided by the K.

In one subembodiment, the second parameter is equal to a minimum integer no less than a quotient of the first parameter divided by the K.

In one subembodiment, the K time domain resources are mutually orthogonal, the first time-domain-resource size is the size of one of the K time domain resources, the target parameter is a second parameter.

In one embodiment, the K is greater than 1, the second parameter is greater than the first parameter, the first parameter and the K are together used to determine the second parameter.

In one subembodiment, the second parameter is equal to a product of the first parameter and the K.

In one subembodiment, the K time domain resources are mutually orthogonal, the first time-domain-resource size is a sum of sizes respectively corresponding to the K time domain resources, the target parameter is the second parameter.

Embodiment 13

Figure 13:
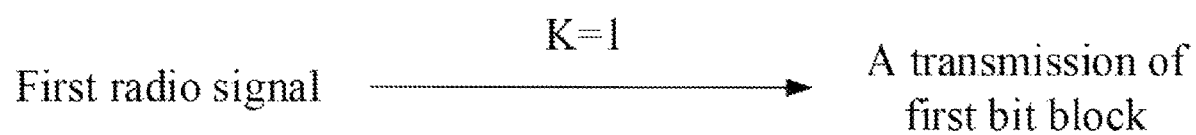
FIG. 13 illustrates a schematic diagram of a relation between a first radio signal and a first bit block according to one embodiment of the present disclosure.

Embodiment 13 illustrates a schematic diagram of a relation between a first radio signal and a first bit block, as shown in FIG. 13.

In Embodiment 13, the K is equal to 1, the first radio signal is a transmission of the first bit block.

In one embodiment, the K is equal to 1, the first radio signal is a transmission of the first bit block corresponding to a redundancy version.

In one embodiment, the K is equal to 1, the first radio signal is one of S repetitions of transmissions of the first bit block; the S repetitions of transmissions of the first bit block are respectively performed in S time units, and the K time domain resources belong to one of the S time units, any two of the S time units are orthogonal (non-overlapped); the S is a positive integer greater than 1.

In one embodiment, the K is equal to 1, the first radio signal is a transmission of the first bit block corresponding to one of S redundancy versions; the S redundancy versions of transmission of the first bit block are respectively performed in S time units, and the K time domain resources belong to one of the S time units, any two of the S time units are orthogonal (non-overlapped); the S is a positive integer greater than 1.

Embodiment 14

Figure 14:
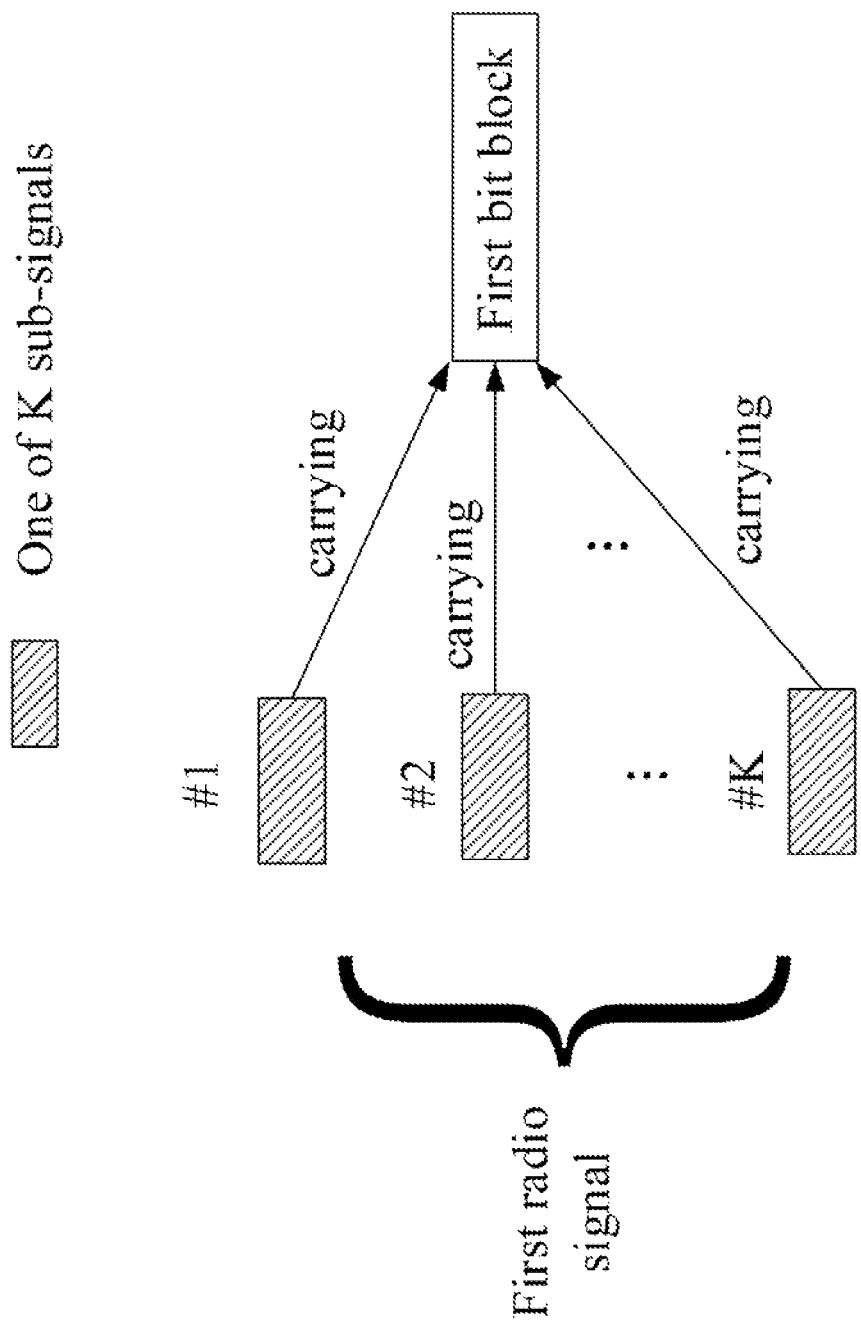
FIG. 14 illustrates a schematic diagram of a relation between a first radio signal and a first bit block according to another embodiment of the present disclosure.

Embodiment 14 illustrates another schematic diagram of a relation between a first radio signal and a first bit block, as shown in FIG. 14.

In Embodiment 14, the K is greater than 1, the first radio signal comprises K sub-signals, the K sub-signals are respectively transmitted in the K time domain resources of the present disclosure, each of the K sub-signals carrying the first bit block.

In one embodiment, the K sub-signals are respectively K repetitions of transmissions of the first bit block.

In one embodiment, the K sub-signals respectively correspond to K redundancy versions of transmission of the first bit block.

In one subembodiment, two of the K redundancy versions are different.

In one subembodiment, any two of the K redundancy versions are different.

In one subembodiment, the K redundancy versions are the same.

Embodiment 15

Embodiment 15 illustrates a schematic diagram of a first time-domain-resource size and a target parameter being used to determine size of a first bit block, as shown in FIG. 15.

In Embodiment 15, a first-type value is a product of a fourth-type value and a number of Physical Resource Blocks (PRBs) occupied by the first radio signal of the present disclosure; the fourth-type value is a smaller value between a fifth-type value and a first reference threshold; the fifth-type value is linear with the first time-domain-resource size and the target parameter respectively, wherein the linear coefficient between the fifth-type value and the first time-domain-resource size is a number of subcarriers comprised in a PRB, and the linear coefficient between the fifth-type value and the target parameter is equal to −1; the fifth-type value is linear with a third-type value, and a linear coefficient between the fifth-type value and the third-type value is equal to −1; a target value is a product of the first-type value, a number of layers of the first radio signal, a target bit rate of the first radio signal and a modulation order of the first radio signal; a second-type value is a greater value between a second reference threshold and a first reference value, wherein the first reference value is a maximum integer in a second-type reference integer set no greater than the target value; the second-type reference integer set comprises a plurality of non-negative integers, wherein any integer in the second-type reference integer set is not greater than the target value, and is a non-negative integral multiple of a third parameter, the target value is used to determine the third parameter, the third parameter is a positive integer; the size of the first bit block is equal to an integer most approximate to the second-type value among all integers no less than the second-type value of a first-type reference integer set; the first-type reference integer set comprises a plurality of positive integers.

In one embodiment, the third-type value is $N_{DMRS}^{PRB}$, and the specific meaning of the $N_{DMRS}^{PRB}$ can be found in 3GPPTS38.214, section 5.1.3.2 or section 6.1.4.2.

In one embodiment, the first radio signal comprises data and DMRS, the third-type value is related to size of time-frequency resources occupied by the DMRS comprised by the first radio signal.

In one embodiment, the first radio signal comprises data and DMRS, the third-type value is equal to a total number of REs occupied by the DMRS comprised by the first radio signal in a PRB.

In one embodiment, the first signaling in the present disclosure is used to determine M DMRS Code Division Multiplexing (CDM) group(s), wherein M is a positive integer; the third-type value is equal to a total number of REs occupied by the M DMRS CDM group(s) in a PRB. The first radio signal does not occupy REs allocated to the M DMRS CDM group(s).

In one subembodiment of the above embodiment, the first radio signal comprises data and DMRS, and the DMRS comprised by the first radio signal belong to one of the M DMRS CDM group(s).

In one subembodiment of the above embodiment, the first radio signal comprises data and DMRS, and the DMRS comprised by the first radio signal belong to at least one of the M DMRS CDM group(s).

In one subembodiment of the above embodiment, the M is equal to 1.

In one subembodiment of the above embodiment, the M is greater than 1.

In one subembodiment of the above embodiment, the M is equal to 2.

In one subembodiment of the above embodiment, the M is equal to 3.

In one embodiment, the operating is receiving, the first-type value is $N_{RE}$. The specific meaning of the $N_{RE}$ can be found in 3GPPTS38.214, section 5.1.3.2.

In one embodiment, the operating is transmitting, the first-type value is $N_{RE}$. The specific meaning of the $N_{RE}$ can be found in 3GPPTS38.214, section 6.1.4.2.

In one embodiment, the operating is receiving, a number of PRBs occupied by the first radio signal is $n_{PRB}$. The specific meaning of the $n_{PRB}$ can be found in 3GPPTS38.214, section 5.1.3.2.

In one embodiment, the operating is transmitting, a number of PRBs occupied by the first radio signal is $n_{PRB}$. The specific meaning of the $n_{PRB}$ can be found in 3GPPTS38.214, section 6.1.4.2.

In one embodiment, the operating is receiving, the fifth-type value is $N'_{RE}$. The specific meaning of the $N'_{RE}$ can be found in 3GPPTS38.214, section 5.1.3.2.

In one embodiment, the operating is transmitting, the fifth-type value is $N'_{RE}$. The specific meaning of the $N'_{RE}$ can be found in 3GPPTS38.214, section 6.1.4.2.

In one embodiment, the first reference threshold is equal to 156.

In one embodiment, the number of subcarriers comprised in a PRB is equal to 12.

In one embodiment, the target value is $N_{info}$. The specific meaning of the $N_{info}$ can be found in 3GPPTS38.214, section 5.1.3.2 or 6.1.4.2.

In one embodiment, the second-type value is $N'_{info}$. The specific meaning of the $N'_{info}$ can be found in 3GPPTS38.214, section 5.1.3.2 or section 6.1.4.2.

In one embodiment, the target value is no greater than 3824.

In one embodiment, for any given non-negative integer, when the given non-negative integer is not greater than the target value and is a positive integral multiple of the third parameter, the given non-negative integer is an integer in the second-type reference integer set.

In one embodiment, the second reference threshold is equal to 24.

In one embodiment, the third parameter is equal to $2^{max(3,\lfloor log_2(target\ value)\rfloor-6)}$.

In one embodiment, the second-type value is equal to max $$\left(24, thirdparameter \cdot \left\lfloor \frac{target\ value}{third\ parameter} \right\rfloor\right).$$

In one embodiment, the first-type reference integer set comprises all TBSs in Table 5.1.3.2-1 in 3GPPTS38.214 (V15.3.0).

Embodiment 16

Embodiment 16 illustrates another schematic diagram of a first time-domain-resource size and a target parameter being used to determine size of a first bit block, as shown in FIG. 16.

In Embodiment 16, a first-type value is a product of a fourth-type value and a number of PRBs occupied by the first radio signal of the present disclosure; the fourth-type value is a smaller value between a fifth-type value and a first reference threshold; the fifth-type value is linear with the first time-domain-resource size and the target parameter respectively, wherein the linear coefficient between the fifth-type value and the first time-domain-resource size is a number of subcarriers comprised in a PRB, and the linear coefficient between the fifth-type value and the target parameter is equal to −1; the fifth-type value is linear with a third-type value, and a linear coefficient between the fifth-type value and the third-type value is equal to −1; a target value is a product of the first-type value, a number of layers of the first radio signal, a target bit rate of the first radio signal and a modulation order of the first radio signal; a second-type value is a greater value between a second reference threshold and a first reference value, wherein the first reference value is an integer in a second-type reference integer set that is most approximate to a reference target value; the reference target value is equal to a difference between the target value and a second bit number, the second bit number is a positive integer; the second-type reference integer set comprises a plurality of non-negative integers, and any integer in the second-type reference integer set is a non-negative integral multiple of a third parameter, the reference target value is used to determine the third parameter, the third parameter is a positive integer; the size of the first bit block is equal to the size of the first bit block is equal to an integer most approximate to the second-type value among all integers no less than the second-type value of a first-type reference integer set; the first-type reference integer set comprises a plurality of positive integers, a sum of a first bit number and any integer of the first-type reference integer set is a positive integral multiple of a fourth parameter, the second-type value is used to determine the fourth parameter, the fourth parameter is a positive integer, and the first bit number is a positive integer.

In one embodiment, the third-type value is $N_{DMRS}^{PRB}$, the specific meaning of the $N_{DMRS}^{PRB}$ can be found in 3GPPTS38.214, section 5.1.3.2, or section 6.1.4.2.

In one embodiment, the first radio signal comprises data and DMRS, the third-type value is related to size of time-frequency resources occupied by the DMRS comprised by the first radio signal.

In one embodiment, the first radio signal comprises data and DMRS, the third-type value is equal to a total number of REs occupied by the DMRS comprised by the first radio signal in a PRB.

In one embodiment, the first signaling in the present disclosure is used to determine M DMRS CDM group(s), wherein M is a positive integer; the third-type value is equal to a total number of REs occupied by the M DMRS CDM group(s) in a PRB. The first radio signal does not occupy REs allocated to the M DMRS CDM group(s).

In one subembodiment of the above embodiment, the first radio signal comprises data and DMRS, and the DMRS comprised by the first radio signal belong to one of the M DMRS CDM group(s).

In one subembodiment of the above embodiment, the first radio signal comprises data and DMRS, and the DMRS comprised by the first radio signal belong to at least one of the M DMRS CDM group(s).

In one subembodiment of the above embodiment, the M is equal to 1.

In one subembodiment of the above embodiment, the M is greater than 1.

In one subembodiment of the above embodiment, the M is equal to 2.

In one subembodiment of the above embodiment, the M is equal to 3.

In one embodiment, the operating is receiving, the first-type value is $N_{RE}$. The specific meaning of the $N_{RE}$ can be found in 3GPPTS38.214, section 5.1.3.2.

In one embodiment, the operating is transmitting, the first-type value is $N_{RE}$. The specific meaning of the $N_{RE}$ can be found in 3GPPTS38.214, section 6.1.4.2.

In one embodiment, the operating is receiving, a number of PRBs occupied by the first radio signal is $n_{PRB}$. The specific meaning of the $n_{PRB}$ can be found in 3GPPTS38.214, section 5.1.3.2.

In one embodiment, the operating is transmitting, a number of PRBs occupied by the first radio signal is $n_{PRB}$. The specific meaning of the $n_{PRB}$ can be found in 3GPPTS38.214, section 6.1.4.2.

In one embodiment, the operating is receiving, the fifth-type value is $N'_{RE}$. The specific meaning of the $N'_{RE}$ can be found in 3GPPTS38.214, section 5.1.3.2.

In one embodiment, the operating is transmitting, the fifth-type value is $N'_{RE}$. The specific meaning of the $N'_{RE}$ can be found in 3GPPTS38.214, section 6.1.4.2.

In one embodiment, the first reference threshold is equal to 156.

In one embodiment, the number of subcarriers comprised in a PRB is equal to 12.

In one embodiment, the target value is $N'_{info}$. The specific meaning of the $N_{info}$ can be found in 3GPPTS38.214, section 5.1.3.2 or section 6.1.4.2.

In one embodiment, the second-type value is $N'_{info}$. The specific meaning of the $N'_{info}$ can be found in 3GPPTS38.214, section 5.1.3.2 or section 6.1.4.2.

In one embodiment, the target value is greater than 3824.

In one embodiment, the first bit number is one of 6, 11, 16 and 24.

In one embodiment, the first bit number is 24.

In one embodiment, for any given positive integer, when a sum of the given positive integer and the first bit number is a positive integral multiple of the fourth parameter, the given positive integer is a positive integer in the first-type reference integer set.

In one embodiment, a target bit rate of the first radio signal is not greater than ¼, the fourth parameter is $$8 \cdot \left\lceil \frac{\text{second-type value} + \text{first bit number}}{3816} \right\rceil.$$

In one embodiment, a target bit rate of the first radio signal is greater than ¼, the second-type value is greater than 8424, the fourth parameter is $$8 \cdot \left\lceil \frac{\text{second-type value} + \text{first bit number}}{8424} \right\rceil.$$

In one embodiment, a target bit rate of the first radio signal is greater than ¼, the second-type value is not greater than 8424, the fourth parameter is equal to 8.

In one embodiment, the size of the first bit block is equal to fourth parameter×

$$\left\lceil \frac{\text{second-type value} + \text{first bit number}}{\text{fourth parameter}} \right\rceil$$

−first bit number.

In one embodiment, for any given non-negative integer, when the given non-given integer is a non-negative integral multiple of the third parameter, the given non-negative integer is a non-negative integer in the second-type reference integer set.

In one embodiment, the second reference threshold is equal to 3840.

In one embodiment, the second bit number is equal to the first bit number.

In one embodiment, the second bit number is one of 6, 11, 16 and 24.

In one embodiment, the second bit number is 24.

In one embodiment, the third parameter is equal to $2^{\lfloor \log_2(\text{reference target value})\rfloor - 5}$.

In one embodiment, the second-type value is equal to max $$\left(3840, \text{third paramenter} \cdot \text{round}\left(\frac{\text{reference target value}}{\text{third paramenter}}\right)\right).$$

Embodiment 17

Figure 17:
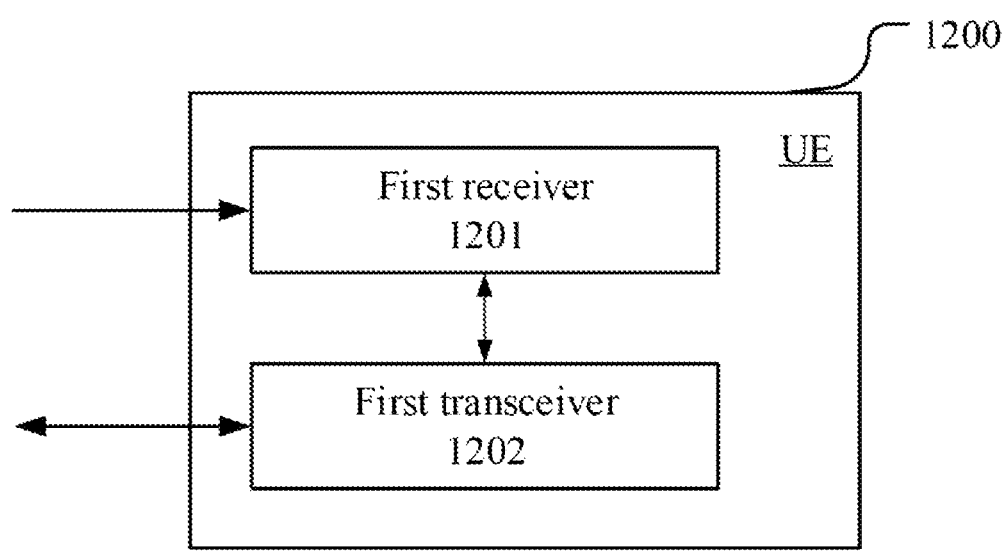
FIG. 17 illustrates a structure block diagram of a processing device in a UE according to one embodiment of the present disclosure.

Embodiment 17 illustrates a structure block diagram of a processing device in a UE, as shown in FIG. 17. In FIG. 17, a UE processing device 1200 comprises a first receiver 1201 and a first transceiver 1202.

In one embodiment, the first receiver 1201 comprises a receiver 456, a receiving processor 452, a first processor 441 and a controller/processor 490 in Embodiment 4.

In one embodiment, the first receiver 1201 comprises at least the first three of a receiver 456, a receiving processor 452, a first processor 441 and a controller/processor 490 in Embodiment 4.

In one embodiment, the first transceiver 1202 comprises a transmitter/receiver 456, a transmitting processor 455, a receiving processor 452, a first processor 441 and a controller/processor 490 in Embodiment 4.

In one embodiment, the first transceiver 1202 comprises at least the first four of a transmitter/receiver 456, a transmitting processor 455, a receiving processor 452, a first processor 441 and a controller/processor 490 in Embodiment 4.

The first receiver 1201 receivers a first signaling, the first signaling being used to determine K time domain resource (s), K being a positive integer;

The first transceiver 1202 operates a first radio signal in the K time domain resource(s).

in Embodiment 17, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the operating is transmitting, or, the operating is receiving.

In one embodiment, a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

In one embodiment, relative magnitude of the first time-domain-resource size and a first threshold is used to determine the target parameter between the first parameter and the second parameter, the first threshold is a positive integer.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to size of one of the K time domain resources, the target parameter is the second parameter.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to a sum of sizes respectively corresponding to the K time domain resources, the target parameter is the second parameter;

In one embodiment, the K is greater than 1, the K is used to determine the second parameter.

In one embodiment, the K is greater than 1, the first radio signal comprises K sub-signals, the K sub-signals are respectively transmitted in the K time domain resources, each of the K sub-signals carrying the first bit block.

In one embodiment, the first receiver 1201 also receives first information; wherein the first information indicates the first parameter.

Embodiment 18

Figure 18:
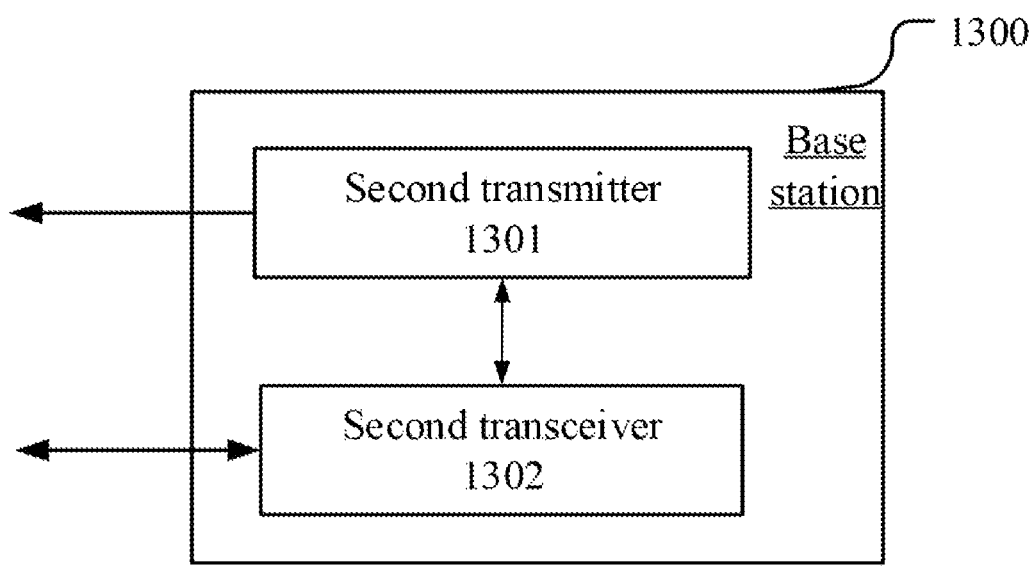
FIG. 18 illustrates a structure block diagram of a processing device in a base station according to one embodiment of the present disclosure.

Embodiment 18 illustrates a structure block diagram of a processing device in a base station, as shown in FIG. 18. In FIG. 18, a processing device 1300 in the base station comprises a second transmitter 1301 and a second transceiver 1302.

In one embodiment, the second transmitter 1301 comprises a transmitter 416, a transmitting processor 415, a first processor 471 and a controller/processor 440 in Embodiment 4.

In one embodiment, the second transmitter 1301 comprises at least the first three of a transmitter 416, a transmitting processor 415, a first processor 471 and a controller/processor 440 in Embodiment 4.

In one embodiment, the second transceiver 1302 comprises a transmitter/receiver 416, a transmitting processor 415, a receiving processor 412, a first processor 471 and a controller/processor 440 in Embodiment 4.

In one embodiment, the second transceiver 1302 comprises at least the first four of a transmitter/receiver 416, a transmitting processor 415, a receiving processor 412, a first processor 471 and a controller/processor 440 in Embodiment 4.

The second transmitter 1301 transmits a first signaling, the first signaling being used to determine K time domain resource(s), K being a positive integer;

the second transceiver 1302 executes a first radio signal in the K time domain resource(s).

in Embodiment 18, the first radio signal carries a first bit block, a first time-domain-resource size and a target parameter are used to determine size of the first bit block, at least one of the K time domain resource(s) is used to determine the first time-domain-resource size; the target parameter is a first parameter or a second parameter; whether the target parameter is the first parameter or the second parameter is related to the first time-domain-resource size, or, whether the target parameter is the first parameter or the second parameter is related to the K; the executing is receiving, or, the executing is transmitting.

In one embodiment, a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter.

In one embodiment, relative magnitude of the first time-domain-resource size and a first threshold is used to determine the target parameter between the first parameter and the second parameter, the first threshold is a positive integer.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to size of one of the K time domain resources, the target parameter is the second parameter.

In one embodiment, when the K is equal to 1, the first time-domain-resource size is equal to size of the K time domain resource, the target parameter is the first parameter; when the K is greater than 1, the K time domain resources are mutually orthogonal, the first time-domain-resource size is equal to a sum of sizes respectively corresponding to the K time domain resources, the target parameter is the second parameter.

In one embodiment, the K is greater than 1, the K is used to determine the second parameter.

In one embodiment, the K is greater than 1, the first radio signal comprises K sub-signals, the K sub-signals are respectively transmitted in the K time domain resources, each of the K sub-signals carrying the first bit block.

In one embodiment, the first receiver also receives first information; herein, the first information indicates the first parameter.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A User Equipment (UE) for wireless communication, comprising:
   a first receiver, receiving a first signaling, the first signaling being used to determine K time domain resource(s), K being a positive integer;
   a first transceiver, operating a first radio signal in the K time domain resource(s);
   wherein the first signaling is a Downlink Control Information (DCI) signaling; the first radio signal carries a first bit block, a first time-domain-resource size and a target parameter are used to determine size of the first bit block, at least one of the K time domain resource(s) is used to determine the first time-domain-resource size; the first bit block comprises a Transport Block (TB), the size of the first bit block is a Transport Block Size (TBS); the target parameter is a first parameter or a second parameter, the first parameter is a positive integer, the second parameter is a positive integer, and the second parameter is less than the first parameter; whether the target parameter is the first parameter or the second parameter is related to the K, the K is a number of transmissions of the first bit block within a slot; when the K is equal to 1, the first radio signal comprises a transmission of the first bit block, and the target parameter is the first parameter; when the K is greater than 1, the first radio signal comprises K sub-signals, and the K sub-signals are respectively K transmissions of the first bit block, the target parameter is the second parameter, and the K is used to determine the second parameter; the operating is transmitting, or, the operating is receiving.

2. The UE according to claim 1, wherein a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter;
   or, relative magnitude of the first time-domain-resource size and a first threshold is used to determine the target parameter between the first parameter and the second parameter, the first threshold is a positive integer.

3. The UE according to claim 1, wherein when the K is equal to 1, the first time-domain-resource size is equal to size of the K time domain resource; when the K is greater than 1, the K time domain resources are mutually orthogonal, the first time-domain-resource size is equal to size of one of the K time domain resources;
   or, when the K is equal to 1, the first time-domain-resource size is equal to size of the K time domain resource; when the K is greater than 1, the K time domain resources are mutually orthogonal, the first time-domain-resource size is equal to a sum of sizes respectively corresponding to the K time domain resources.

4. The UE according to claim 1, wherein the first parameter is a positive integer, the second parameter is a positive integer, the K is greater than 1, the second parameter is equal to a minimum integer no less than a quotient of the first parameter divided by the K.

5. The UE according to claim 1, wherein the first receiver also receives first information;
   wherein the first information indicates the first parameter.

6. A base station for wireless communication, comprising:
   a second transmitter, transmitting a first signaling, the first signaling being used to determine K time domain resource(s), K being a positive integer; and
   a second transceiver, executing a first radio signal in the K time domain resource(s);
   wherein the first signaling is a Downlink Control Information (DCI) signaling; the first radio signal carries a first bit block, a first time-domain-resource size and a target parameter are used to determine size of the first bit block, at least one of the K time domain resource(s) is used to determine the first time-domain-resource size; the first bit block comprises a Transport Block (TB), the size of the first bit block is a Transport Block Size (TBS); the target parameter is a first parameter or a second parameter, the first parameter is a positive integer, the second parameter is a positive integer, and the second parameter is less than the first parameter; whether the target parameter is the first parameter or the second parameter is related to the K, the K is a number of transmissions of the first bit block within a slot; when the K is equal to 1, the first radio signal comprises a transmission of the first bit block, and the target parameter is the first parameter; when the K is greater than 1, the first radio signal comprises K sub-signals, and the K sub-signals are respectively K transmissions of the first bit block, the target parameter is the second parameter, and the K is used to determine the second parameter; the executing is receiving, or, the executing is transmitting.

7. The base station according to claim 6, wherein a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter;
or, relative magnitude of the first time-domain-resource size and a first threshold is used to determine the target parameter between the first parameter and the second parameter, the first threshold is a positive integer.

8. The base station according to claim 6, wherein when the K is equal to 1, the first time-domain-resource size is equal to size of the K time domain resource; when the K is greater than 1, the K time domain resources are mutually orthogonal, the first time-domain-resource size is equal to size of one of the K time domain resources;
or, when the K is equal to 1, the first time-domain-resource size is equal to size of the K time domain resource; when the K is greater than 1, the K time domain resources are mutually orthogonal, the first time-domain-resource size is equal to a sum of sizes respectively corresponding to the K time domain resources.

9. The base station according to claim 6, wherein the first parameter is a positive integer, the second parameter is a positive integer, the K is greater than 1, the second parameter is equal to a minimum integer no less than a quotient of the first parameter divided by the K.

10. The base station according to claim 6, wherein the second transmitter also transmits first information; wherein the first information indicates the first parameter.

11. A method in a UE for wireless communication, comprising:
receiving a first signaling, the first signaling being used to determine K time domain resource(s), K being a positive integer; and
operating a first radio signal in the K time domain resource(s);
wherein the first signaling is a Downlink Control Information (DCI) signaling; the first radio signal carries a first bit block, a first time-domain-resource size and a target parameter are used to determine size of the first bit block, at least one of the K time domain resource(s) is used to determine the first time-domain-resource size; the first bit block comprises a Transport Block (TB), the size of the first bit block is a Transport Block Size (TBS); the target parameter is a first parameter or a second parameter, the first parameter is a positive integer, the second parameter is a positive integer, and the second parameter is less than the first parameter; whether the target parameter is the first parameter or the second parameter is related to the K, the K is a number of transmissions of the first bit block within a slot; when the K is equal to 1, the first radio signal comprises a transmission of the first bit block, and the target parameter is the first parameter; when the K is greater than 1, the first radio signal comprises K sub-signals, and the K sub-signals are respectively K transmissions of the first bit block, the target parameter is the second parameter, and the K is used to determine the second parameter; the operating is transmitting, or, the operating is receiving.

12. The method according to claim 11, wherein a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter;
or, relative magnitude of the first time-domain-resource size and a first threshold is used to determine the target parameter between the first parameter and the second parameter, the first threshold is a positive integer.

13. The method according to claim 11, wherein when the K is equal to 1, the first time-domain-resource size is size of the K time domain resource; when the K is greater than 1, the K time domain resources are mutually orthogonal, the first time-domain-resource size is equal to size of one of the K time domain resources;
or, when the K is equal to 1, the first time-domain-resource size is equal to size of the K time domain resource; when the K is greater than 1, the K time domain resources are mutually orthogonal, the first time-domain-resource size is equal to a sum of sizes respectively corresponding to the K time domain resources.

14. The method according to claim 11, wherein
the first parameter is a positive integer, the second parameter is a positive integer, the K is greater than 1, the second parameter is equal to a minimum integer no less than a quotient of the first parameter divided by the K.

15. The method according to claim 11, comprising:
receiving first information;
wherein the first information indicates the first parameter.

16. A method in a base station for wireless communication, comprising:
transmitting a first signaling, the first signaling being used to determine K time domain resource(s), K being a positive integer; and
executing a first radio signal in the K time domain resource(s);
wherein the first signaling is a Downlink Control Information (DCI) signaling; the first radio signal carries a first bit block, a first time-domain-resource size and a target parameter are used to determine size of the first bit block, at least one of the K time domain resource(s) is used to determine the first time-domain-resource size; the first bit block comprises a Transport Block (TB), the size of the first bit block is a Transport Block Size (TBS); the target parameter is a first parameter or a second parameter, the first parameter is a positive integer, the second parameter is a positive integer, and the second parameter is less than the first parameter; whether the target parameter is the first parameter or the second parameter is related to the K, the K is a number of transmissions of the first bit block within a slot; when the K is equal to 1, the first radio signal comprises a transmission of the first bit block, and the target parameter is the first parameter; when the K is greater than 1, the first radio signal comprises K sub-signals, and the K sub-signals are respectively K transmissions of the first bit block, the target parameter is the second parameter, and the K is used to determine the second parameter; the executing is receiving, or, the executing is transmitting.

17. The method according to claim 16, wherein a first integer set corresponds to the first parameter, and a second integer set corresponds to the second parameter, the first integer set comprises a positive integer number of positive integer(s), the second integer set comprises a positive integer number of positive integer(s), none of the positive integer(s) in the first integer set belongs to the second integer set; when the first time-domain-resource size is a positive integer in the first integer set, the target parameter is the first parameter; when the first time-domain-resource size is a positive integer in the second integer set, the target parameter is the second parameter;

or, relative magnitude of the first time-domain-resource size and a first threshold is used to determine the target parameter between the first parameter and the second parameter, the first threshold is a positive integer.

18. The method according to claim 16, wherein when the K is equal to 1, the first time-domain-resource size is equal to size of the K time domain resource; when the K is greater than 1, the K time domain resources are mutually orthogonal, the first time-domain-resource size is equal to size of one of the K time domain resources;

or, when the K is equal to 1, the first time-domain-resource size is equal to size of the K time domain resource; when the K is greater than 1, the K time domain resources are mutually orthogonal, the first time-domain-resource size is equal to a sum of sizes respectively corresponding to the K time domain resources.

19. The method according to claim 16, wherein the first parameter is a positive integer, the second parameter is a positive integer, the K is greater than 1, the second parameter is equal to a minimum integer no less than a quotient of the first parameter divided by the K.

20. The method according to claim 16, comprising:
transmitting first information;
wherein the first information indicates the first parameter.

* * * * *